(12) United States Patent
Zhan et al.

(10) Patent No.: US 11,455,088 B2
(45) Date of Patent: Sep. 27, 2022

(54) CONTEXTUAL NOTES FOR ONLINE MEETINGS

(71) Applicant: Citrix Systems, Inc., Fort Lauderdale, FL (US)

(72) Inventors: Tao Zhan, Nanjing (CN); Zongpeng Qiao, Nanjing (CN); Ze Chen, Nanning (CN); Ke Xu, Nanjing (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/155,404

(22) Filed: Jan. 22, 2021

(65) Prior Publication Data

US 2022/0206673 A1 Jun. 30, 2022

Related U.S. Application Data

(63) Continuation of application No. PCT/CN2020/141328, filed on Dec. 30, 2020.

(51) Int. Cl.
*G06F 3/04842* (2022.01)
*H04L 65/403* (2022.01)
*G06F 40/169* (2020.01)

(52) U.S. Cl.
CPC ........ *G06F 3/04842* (2013.01); *G06F 40/169* (2020.01); *H04L 65/403* (2013.01)

(58) Field of Classification Search
CPC ............. H04L 12/1822; H04L 12/1818; H04L 12/1831; H04L 65/403; G06F 3/04842; G06F 40/169
See application file for complete search history.

(56) References Cited

U.S. PATENT DOCUMENTS

2013/0024452 A1* 1/2013 Defusco ................ G06F 40/186
707/737
2014/0108557 A1* 4/2014 Calman ................. G06Q 40/02
709/205

(Continued)

FOREIGN PATENT DOCUMENTS

| CN | 103065659 A | 4/2013 |
| CN | 107580705 A | 1/2018 |
| CN | 109145149 A | 1/2019 |

OTHER PUBLICATIONS

Xiang Zhang et al., The On-The-Spot Meeting Analysis and Archiving System, May 5, 2008, IEEE Xplore, pp. 975-979 (Year: 2008).*

(Continued)

*Primary Examiner* — Tam T Tran
(74) *Attorney, Agent, or Firm* — Daly, Crowley, Mofford & Durkee, LLP

(57) ABSTRACT

In one aspect, an example methodology implementing the disclosed techniques includes, by a computing device, receiving an input from a user during an online meeting and generating a note comprising the input and a timestamp recording a point in time within the online meeting at which the note is generated. The method also includes, by the computing device, providing a user interface in which to display content of the online meeting and the note, the user interface including an annotation marker indicative of an availability of the note and, in response to a selection of the note in the user interface, adjusting a display of the content to a point in the content corresponding to the timestamp.

10 Claims, 22 Drawing Sheets

(56) References Cited

U.S. PATENT DOCUMENTS

| | | | | |
|---|---|---|---|---|
| 2015/0373063 | A1* | 12/2015 | Vashishtha | H04L 65/403 |
| | | | | 348/14.07 |
| 2015/0378995 | A1* | 12/2015 | Brown | H04L 12/1827 |
| | | | | 707/608 |
| 2016/0234268 | A1* | 8/2016 | Ouyang | H04L 65/4069 |
| 2016/0352788 | A1* | 12/2016 | Sawhney | H04L 65/1069 |
| 2016/0364025 | A1* | 12/2016 | Bernstein | G06F 3/04883 |
| 2017/0064254 | A1* | 3/2017 | Mueller | H04L 12/1831 |
| 2017/0193118 | A1* | 7/2017 | Pratt | G06F 16/2428 |
| 2020/0007942 | A1 | 1/2020 | Stanis | |

OTHER PUBLICATIONS

Bon Adriel Aseniero et al., MeetingCues: Supporting Online Meetings Experience, Oct. 1, 2020, IEEE Xplore, pp. 236-240 (Year: 2020).*

"Cisco Webex Meetings—Cisco Webex Assistant for Webex Meetings at-a-Glance-Cisco", https://www.cisco.com/c/en/us/products/collateral/conferencing/webex-meetings/at-a-glance-c45-744053.html, printed Oct. 18, 2021, 3 pages.

"Now Create Best Meeting Minutes with a Virtual Assistant", https://www.meetaira.ai/blogs/best-meeting-minutes-using-virtual-assistant/, printed Oct. 18, 2021, 14 pages.

"Remote Meeting Collaboration and AI Assitance", https://www.avoma.com/solution/remote-meetings, printed Oct. 18, 2021, 8 pages.

International Search Report and Written Opinion for App. No. PCT/CN2020/141328, dated Sep. 28, 2021, 9 pages.

* cited by examiner

CONTEXTUAL NOTES FOR ONLINE MEETINGS

CROSS REFERENCE TO RELATED APPLICATION

This application is a continuation of and claims the benefit of PCT Patent Application No. PCT/CN2020/141328 filed on Dec. 30, 2020 in the English language in the State Intellectual Property Office and designating the United States, the contents of which are hereby incorporated herein by reference in its entirety.

BACKGROUND

Due, at least in part, to the growth of the Internet and the World Wide Web (commonly known as the Web), more and more content is available to more and more people. This network growth has also led to the development of cloud-based services and platforms, and use of such services and platforms by organizations, such as companies, enterprises, governments, and agencies, to implement digital resource management service solutions. These digital resource management service solutions provide an integrated technology framework designed to deliver and manage applications, data, and desktop delivery. For example, through a digital resource management service, an organization's users are able to access online meeting applications and services, such as SLACK®, SKYPE®, and MICROSOFT TEAMS®, to rapidly share, gather, and process information collaboratively.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

It is appreciated herein that, although some online meeting applications may provide note taking features for taking notes associated with an online meeting, the generated notes are difficult to use and/or comprehend after the online meeting has concluded. For example, a given online meeting application may allow users to take notes during a meeting, however, the online meeting application may not integrate the notes with a recording of the online meeting. Thus, the notes and recording of the meeting are separate and distinct pieces of data which poses challenges in maintenance and effective use of it. For example, the review and sharing of the notes occur via a separate communication stream from the associated playback of the online meeting recording. Also, the online meeting application may not provide any context for the notes, meaning that the review and understanding of the notes after the online meeting has concluded is difficult because the notes lack any relevant context in relation to the point in the meeting at which the notes were taken. Without such context, notes become difficult to understand and/or their significance is not readily apparent or otherwise misunderstood when the notes are viewed in isolation. Attempts to manually identify the location at notes were taken is a time consuming and frustrating experience that is often times unsuccessful. Such poor user experience leads to users giving up after significant effort without finding the content they were looking for or mistakenly selecting a portion of the content unrelated to the note. The challenges described here are almost insurmountable for users who did not attend the meeting at the time of the recording or previously viewed the recording because they lack any first-hand knowledge of the content discussed at the meeting. In such instances, any notes taken are likely useless to later non-attendee viewers of the recording unless they view recording multiple times because they lack the knowledge to accurately and efficiently put the pieces of data together. Even viewing the recording several times may not be enough in some instances when the same or similar topics are discussed at different points within the meeting. Embodiments of the present disclosure provide solutions to these and other technical problems described herein.

In accordance with one illustrative embodiment provided to illustrate the broader concepts, systems, and techniques described herein, a method may include, by a computing device, receiving an input from a user during an online meeting and generating a note comprising the input and a timestamp recording a point in time within the online meeting at which the note is generated. The method may also include, by the computing device, providing a user interface in which to display content of the online meeting and the note, the user interface including an annotation marker indicative of an availability of the note and, in response to a selection of the note in the user interface, adjusting a display of the content to a point in the content corresponding to the timestamp.

According to another illustrative embodiment provided to illustrate the broader concepts described herein, a system includes a memory and one or more processors in communication with the memory. The processor may be configured to receive an input from a user during an online meeting and generate a note comprising the input and a timestamp recording a point in time within the online meeting at which the note is generated. The processor may be further configured to provide a user interface in which to display content of the online meeting and the note, the user interface including an annotation marker indicative of an availability of the note and, in response to a selection of the note in the user interface, adjust a display of the content to a point in the content corresponding to the timestamp.

According to another illustrative embodiment provided to illustrate the broader concepts described herein, a method may include, by a computing device, receiving content of an online meeting and receiving an input from a user, the input including an indication of time in which the input was received by the computing device. The method may also include, by the computing device, providing a user interface in which to display the content of the online meeting and the received input, the user interface including an annotation and being configured to adjust a display of the content to a point in the content the same as that of the indication of time included with the received input in response to a selection of the received input or the annotation, the annotation included with the display of the content being indicative of an availability of the received input.

According to another illustrative embodiment provided to illustrate the broader concepts described herein, a system includes a memory and one or more processors in communication with the memory. The processor may be configured to receive content of an online meeting and receive an input from a user, the input including an indication of time in which the input was received by the computing device. The processor may be further configured to provide a user interface in which to display the content of the online meeting and the received input, the user interface including an annotation and being configured to adjust a display of the content to a point in the content the same as that of the indication of time included with the received input in response to a selection of the received input or the annotation, the annotation included with the display of the content being indicative of an availability of the received input.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
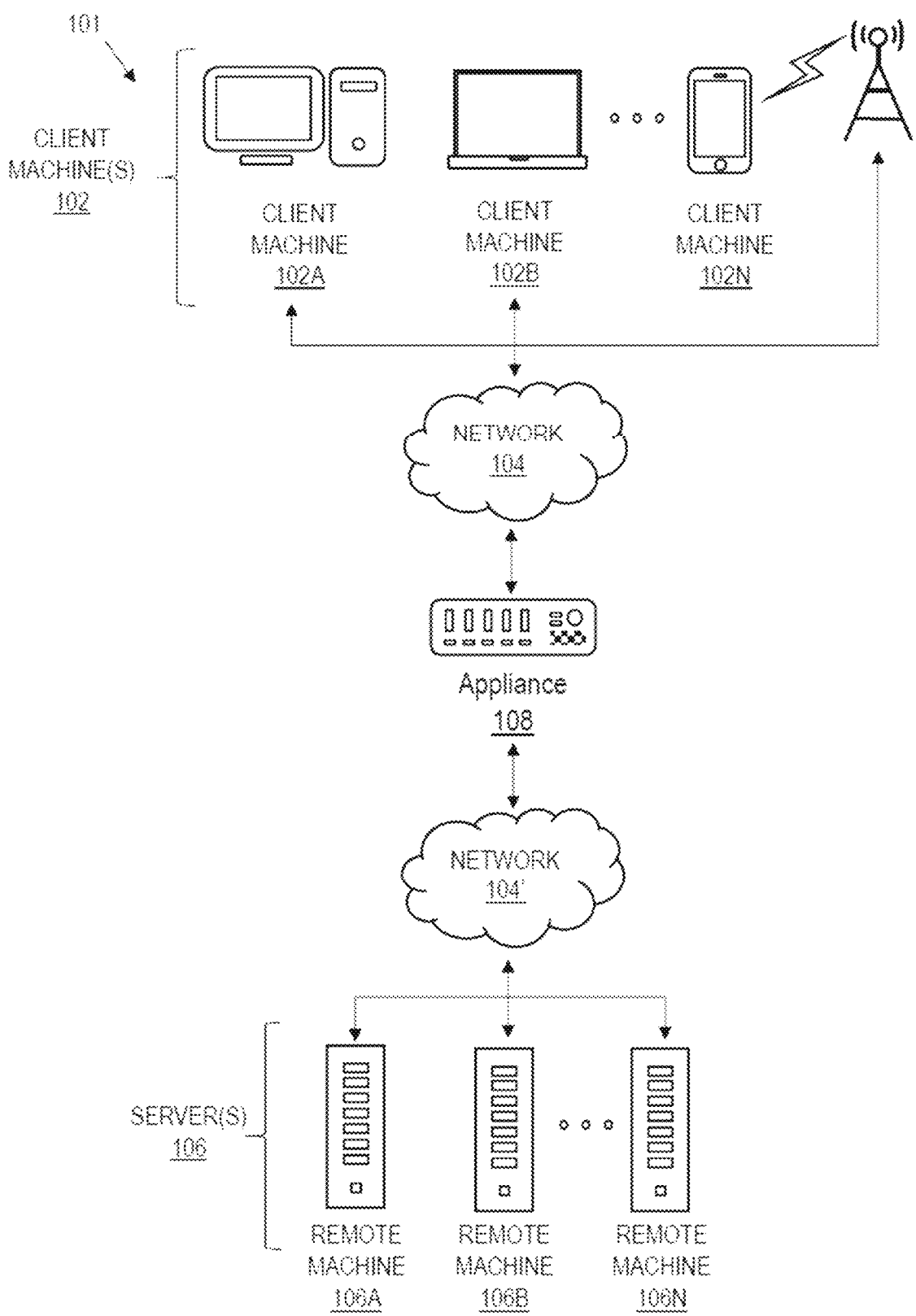
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
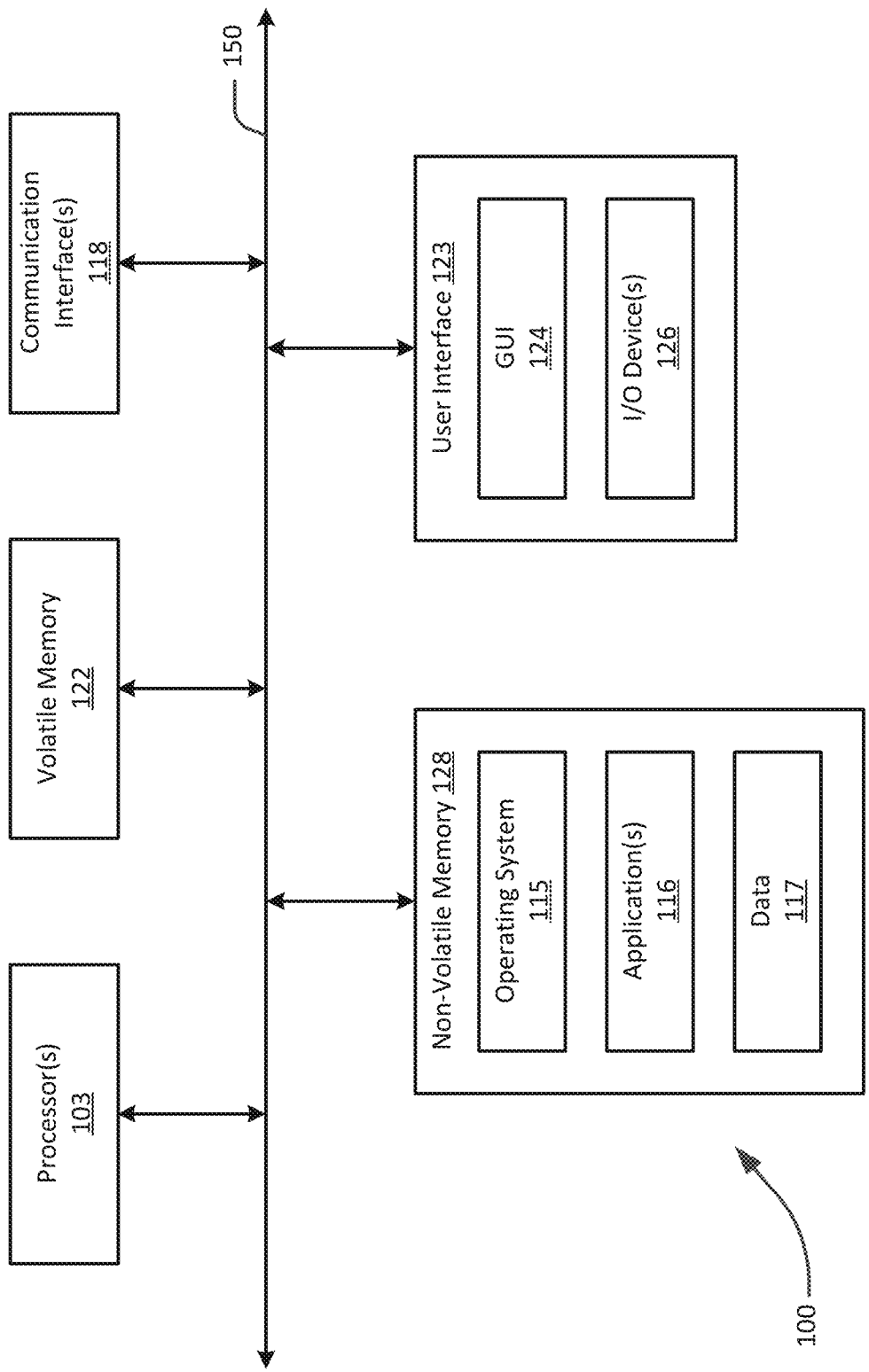
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
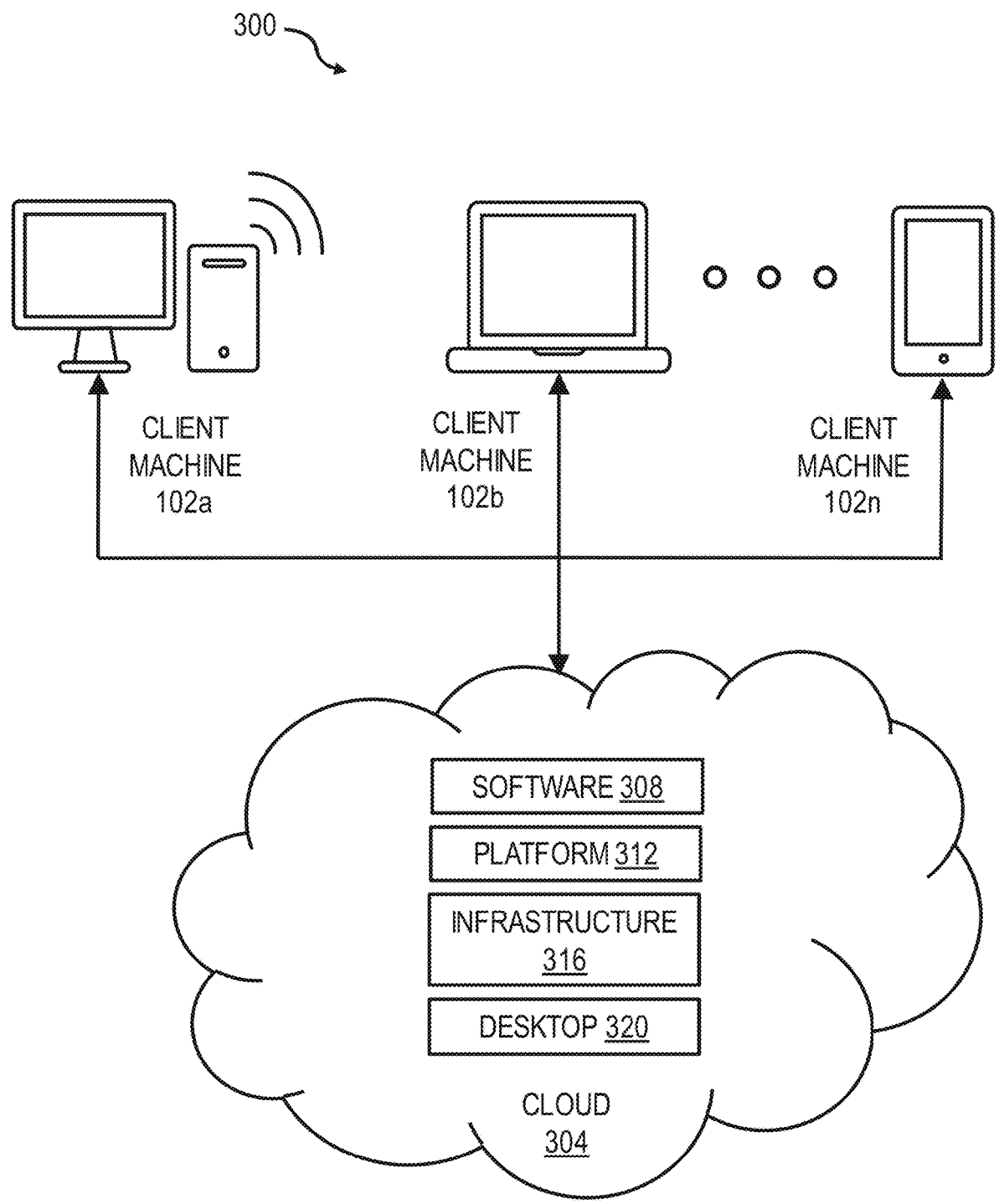
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
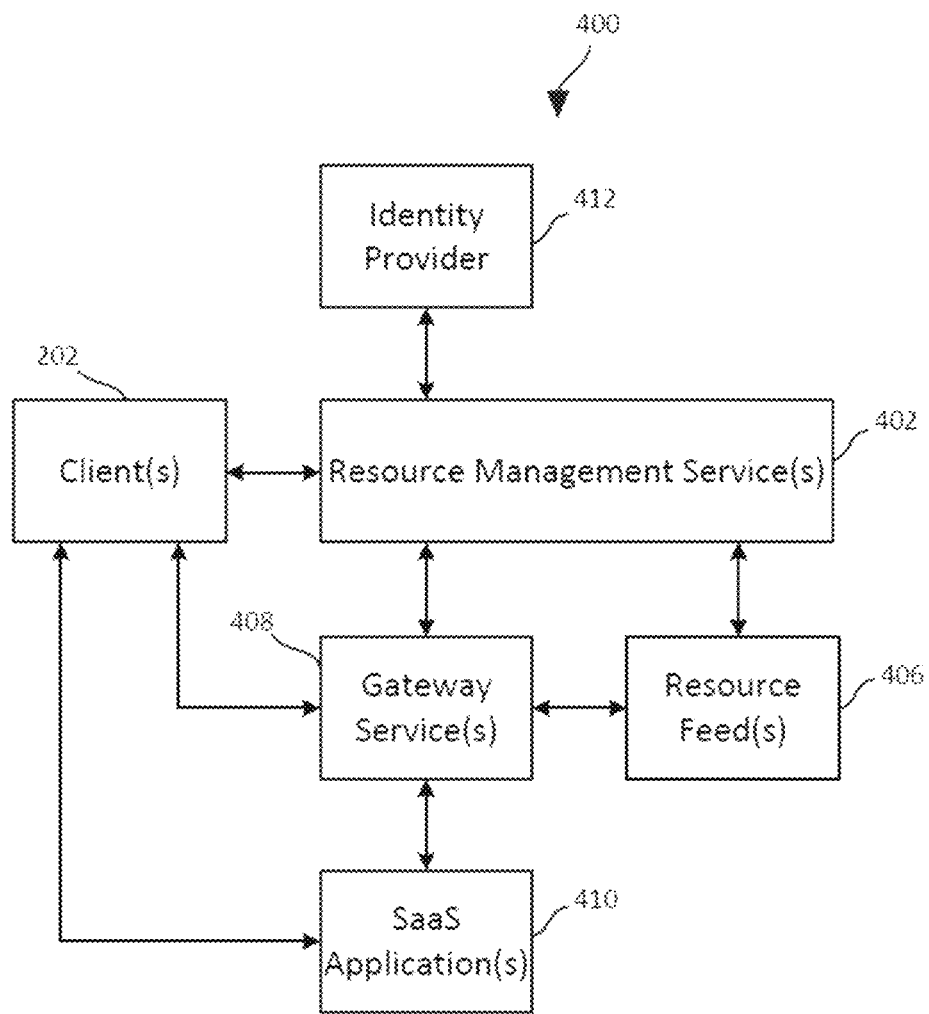
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
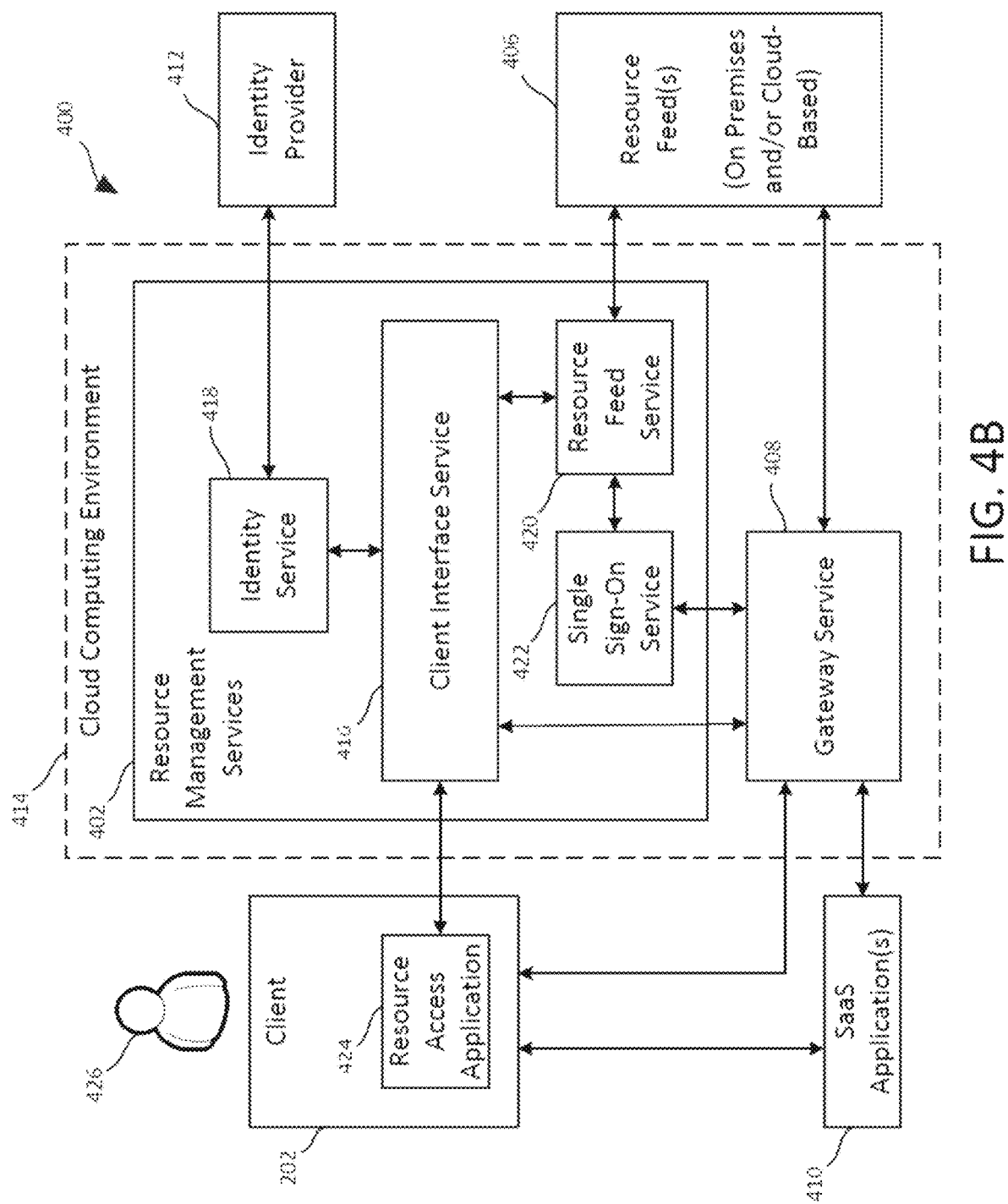
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
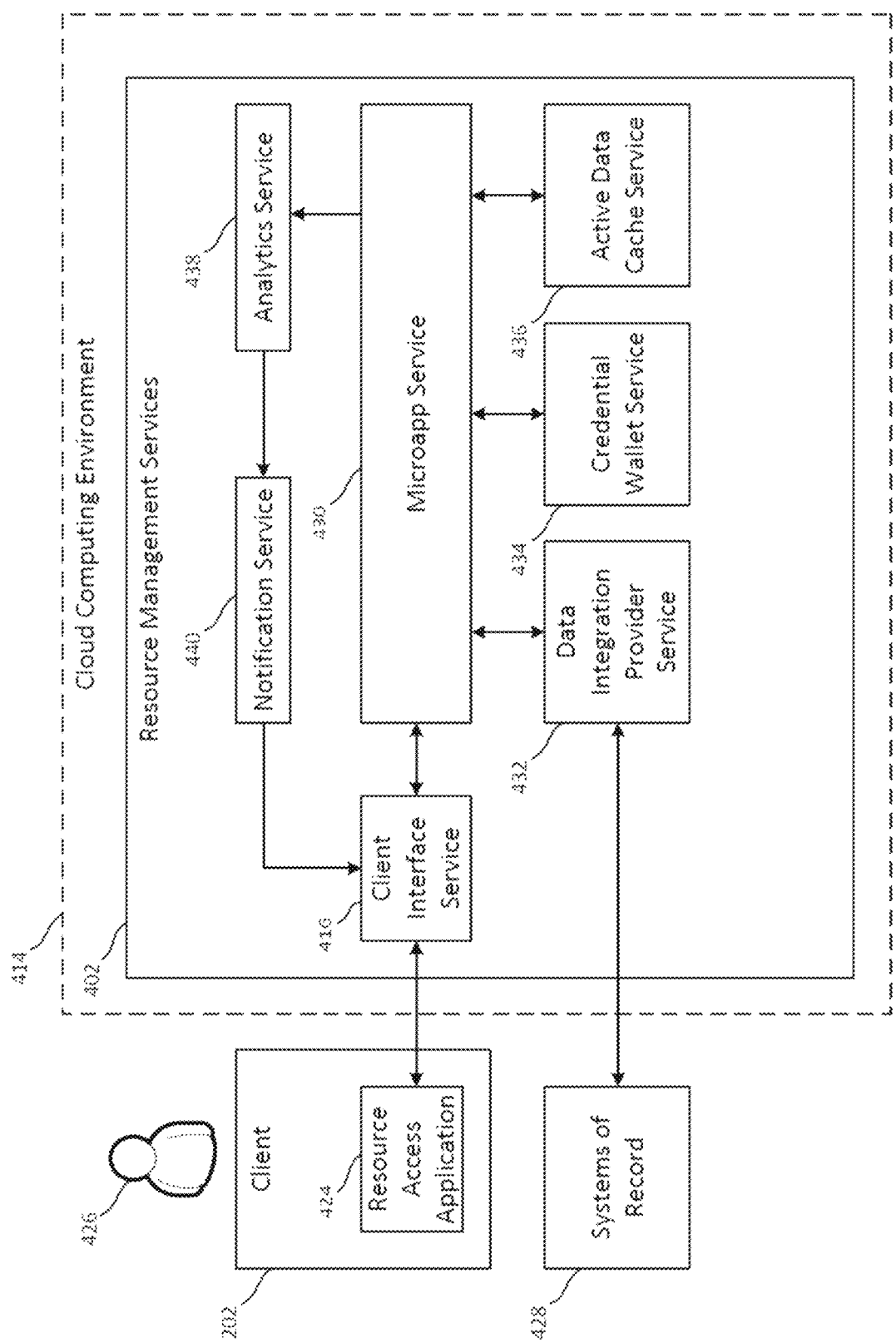
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
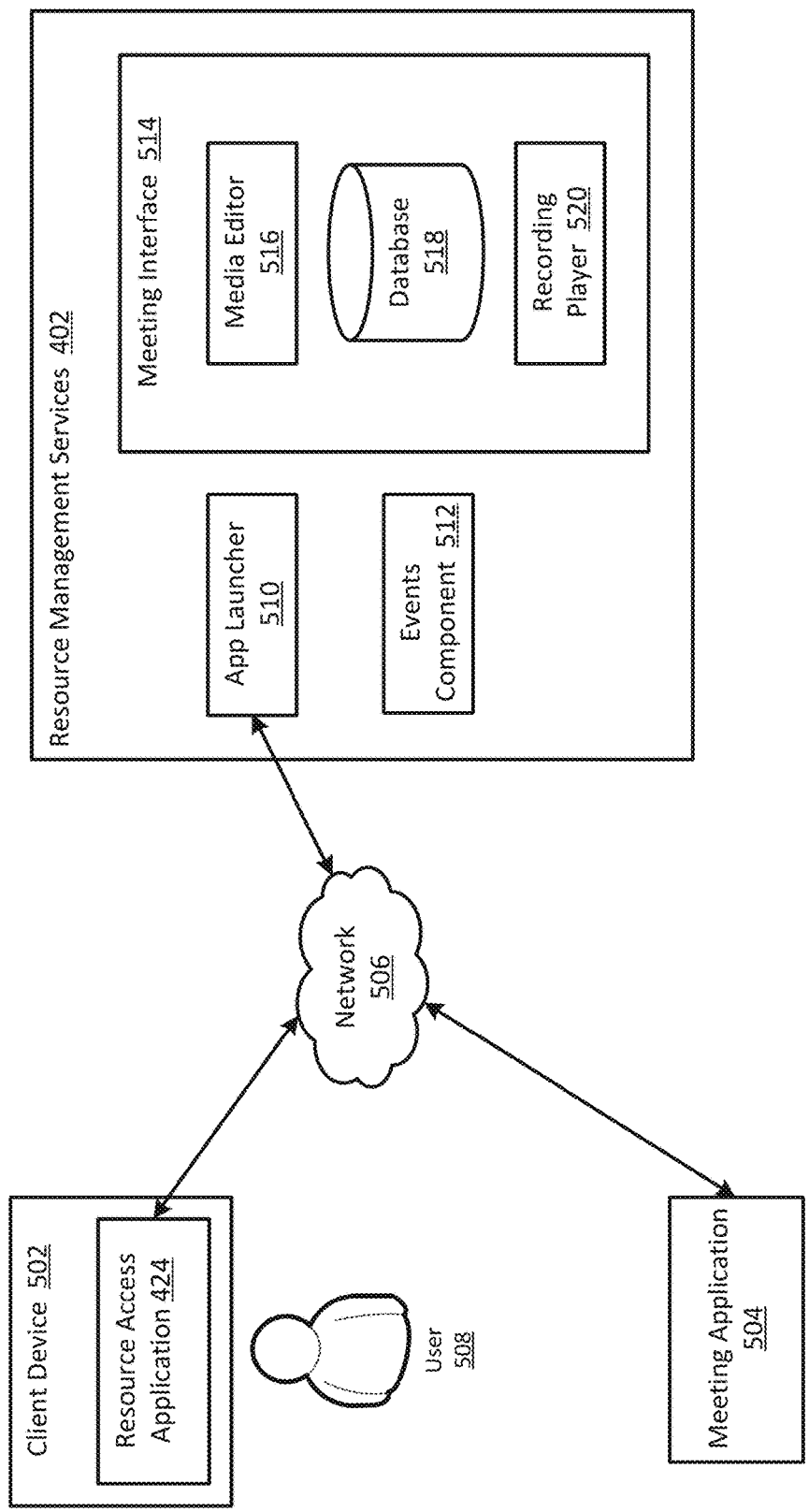
FIG. 5 is a block diagram of an example network environment in which capture of notes for an online meeting may be implemented, in accordance with an embodiment of the present disclosure.

FIG. 5 is a block diagram of an example network environment 500 in which capture of notes for an online meeting may be implemented, in accordance with an embodiment of the present disclosure. In FIG. 5, like elements of system 400 of FIGS. 4A-4C are shown using like reference designators. As such, the previous relevant discussion with respect to features of the like elements shown using like reference designators is equally applicable here, including the previous relevant discussion with respect to resource access application 424 and resource management services 402.

As shown in FIG. 5, network environment 500 can include one or more client devices 502, resource management services 402, and a meeting application 504 communicably coupled to one another via a network 506. Network 506 may correspond one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks. In some embodiments, network 506 may include another network or a portion or portions of other networks.

Network environment 500 may provide services for one or more organizations, with the organizations having one or more users associated with it. A given client device 502 may be assigned to or otherwise associated with a particular user. For example, as shown in FIG. 5, client device 502 may be assigned to, or associated with, a user 508. While only one client device 502 and one corresponding user 508 are shown in FIG. 5, the structures and techniques sought to be protected herein can be applied to any number of organizations, users, and devices.

Client device 502 can include smartphones, tablet computers, laptop computers, desktop computers, or other computing devices configured to run user applications (or "apps"). In some embodiments, a client device 502 may be substantially similar to client machine 102 described above in the context of FIGS. 1 and 3, computing device 100 described above in the context of FIG. 2, and/or client 202 described above in the context of FIGS. 4A-4C.

Meeting application 504 may provide collaboration and communication functionality to allow users to host and/or participate in an interactive online meeting from various locations. For example, in certain embodiments, meeting application 504 may be provided as a Software as a Service (SaaS) application. Users can use computing devices (e.g., client devices 502) to join and participate in an online meeting during which documents can be shared and edited, whiteboard sessions can be conducted, tasks can be assigned and tracked, and voice, chat (e.g., collaboration messaging), instant messaging, and video communications can be conducted, among other features. In one illustrative implementation, meeting application 504 may be delivered as a cloud service within a cloud, such as cloud computing environment 414 of FIGS. 4B and 4C. Nonlimiting examples of meeting application 504 include SLACK®, SKYPE®, ZOOM, and MICROSOFT TEAMS®.

With continued reference to, and as shown in FIG. 5, resource management services 402 can include an application launcher 510, an events component 512, and a meeting interface 514. In one illustrative scenario, user 508 may access resource management services 402 and other services (e.g., meeting application 504) and network resources using resource access application 424 installed on client 502. As described previously, resource access application 424 and associated components may provide user 508 with a personalized, all-in-one interface enabling seamless access to the user's resources, such as SaaS and web applications, files, virtual Windows applications, virtual Linux applications, desktops, mobile applications, Citrix Virtual Apps and Desktops™, local applications, and other data. In one example, resource access application 424 may be the CITRIX WORKSPACE app. In an implementation, resource access application 424 may include a web browser for accessing meeting application 504 along with other types of web apps and websites.

For example, when user 508 selects meeting application 504, resource access application 424 may utilize application launcher 510 to launch meeting application 504 and establish the communications to enable resource access application 424 to communicate directly with meeting application 504. In one illustrative implementation, application launcher 510 may notify events component 512 of the launch of meeting application 504 by resource access application 424. In response to the notification of the launch of meeting application 504 by resource access application 424, events component 512 may record the launch event. Upon recording the launch event, events component 512 may notify or otherwise inform meeting interface 514 of the launching of meeting application 514. The notification allows meeting interface 514 to collaborate with resource access application 424 to provide an actionable icon configured to launch meeting interface 514. In this regard, in some embodiments, application launcher 510 may be substantially similar to client interface service 416 and gateway service 408 described above in the context of FIG. 4B.

As a solution to the aforementioned and other technical problems, in some embodiments, resource access application 424 may be programmed or otherwise configured to provide a user interface element, such as an actionable icon (e.g., button) that can be selected, clicked, or otherwise activated to launch meeting interface 514. In one illustrative implementation, upon detecting user 508 launching meeting application 504, for example, to participate in an online meeting, resource access application 424 can provide the actionable icon that allows user 508 to launch meeting interface 514. In brief, as will be described in turn further below, meeting interface 514 can be understood as enabling the inputting of items of content (e.g., media content) during an online meeting, the generating of notes from the input items of content, the correlating of the notes with specific points in time, within the online meeting, at which the corresponding notes were generated, and the use of the notes during the playing of a recording of the online meeting to navigate to corresponding points in time in the recording.

As can be seen in FIG. 5, meeting interface 514 can include a media editor 516, a database 518, and a recording player 520. In some embodiments, media editor 516 is configured to manage the inputting of items of content during an online meeting, the generating of notes from the input items of content, and the correlating of the generated notes with specific points in time, within the online meeting, at which the corresponding notes were generated. To this end, media editor 516 may provide a user interface that includes a content panel and a control panel. The content panel is configured to display content (e.g., shared window, shared desktop, video feeds from the meeting participants, etc.) associated with the online meeting. The control panel is configured to receive items of content in one or more modalities, such as text, images, screenshots, free draw (e.g., sketch), indications of highlight (e.g., important) segments, indications of nonsense (e.g., unimportant or off target) segments, or any combination of these modalities. In one illustrative implementation, the control panel may provide user interface control elements, such as, for example, a "Text Mode" button, a "Image" button, a "Screenshot" button, a "Free Draw" button, a "Highlights" button, and a "Relevancy" button, that can be selected or otherwise activated to input media content in a desired modality.

For example, in response to user 508 selecting the "Text Mode" button, media editor 516 allows user 508 to provide input in the form of text (e.g., text comment) to the control panel. Media editor 516 may allow user 508 to subsequently edit, move, or delete previously input text. Media editor 516 may also allow user 508 to copy an input item of text, for example, into a clipboard, for pasting the copied item of text at another point in time within the online meeting.

In response to user 508 selecting the "Image" button, media editor 516 allows user 508 to input an image as an item of content to the control panel. For example, media editor 516 may display a dialog box with which user 508 can search for and select or otherwise specify a desired image filename (i.e., filename of a file that contains the image), and select an insert button provided in the dialog box to input the image contained in the file to the control panel. In some implementations, media editor 516 may allow user 508 to drag and drop one image from a local device to the control panel. The image can also be added in this way. In some implementations, media editor 516 may allow user 508 to copy a link that references an image to the control panel.

In response to user 508 selecting the "Screenshot" button, media editor 516 allows user 508 to input a screenshot of the current window of meeting application 504 (i.e., a screenshot of the current window of a meeting application that is being used to host the online meeting) as an item of content to the control panel. For example, the content that is currently being displayed in the content panel represents the current window of meeting application 504. Thus, in certain embodiments, media editor 516 can take a snapshot image of the content that is being displayed in the content panel and input the image to the control panel. In an embodiment, in response to user 508 selecting the "Screenshot" button, media editor 516 may provide a user interface element, such as an icon or an input dialog box, that allows user 508 to close or otherwise hide one or more application windows, including, for example, a window of meeting application 504 to prevent the potential loss or unintended exposure of content displayed within the application window(s).

In response to user 508 selecting the "Free Draw" button, media editor 516 allows user 508 to provide input in the form of a drawing to the control panel. In the free draw mode, user 508 can draw directly on an area of the control panel using a pointing device (e.g., a mouse, a stylus pen, or other suitable drawing instrument) or touchscreen device. In an illustrative implementation, media editor 516 may provide a drawing tool palette that includes one or more drawing shapes, such as a rectangle, square, circle, oval, line, flowchart shape, and the like, for use by user 508 to create a drawing. Similar to the text input mode, media editor 516 may allow user 508 to subsequently edit, move, or delete a previously input drawing as well as copy an input drawing, for example, into a clipboard, for pasting the copied drawing at another point in time within the online meeting. In certain embodiments, media editor 516 can take a snapshot image of the portion of the control panel on which the drawing is made and input the drawing as an image to the control panel.

The "Highlights" button allows user 508 to indicate specific segments of the online meeting to highlight. For instance, user 508 may want to highlight important segments of the online meeting, such as segments of the online meeting during which the discussion is regarding important topics, for example. To do so, user 508 can select the "Highlights" button to indicate a start of an important segment of the online meeting (i.e., indicate a start of a segment of the online meeting to highlight). In response to user 508 selecting the "Highlights" button, media editor 516 can generate a highlight start tag that includes a timestamp that records a specific point in time within the online meeting, and input the generated highlight start tag to the control panel. The point in time recorded in the highlight start tag is a start of an important segment (i.e., a start of a highlight segment) within the online meeting. User 508 can then select the "Highlights" button again to indicate a corresponding end of the important segment of the online meeting (i.e., indicate a corresponding end of the segment of the online meeting being highlighted). In response to user 508 selecting the "Highlights" button again, media editor 516 can generate a highlight end tag that includes a timestamp that records a specific point in time within the online meeting and input the generated highlight end tag to the control panel. The point in time recorded in the highlight end tag is an end of an important segment (i.e., an end of a highlight segment) within the online meeting. In this manner, user 508 may use the "Highlights" button to indicate one or more segments of the online meeting to highlight.

The "Relevancy" button allows user 508 to indicate specific segments of the online meeting that are not important or off topic (e.g., specific segments in which the discussion is not important, off topic, or otherwise nonsense). For example, user 508 may want to indicate unimportant segments of the online meeting, such as segments of the online meeting during which the discussion is off topic or unrelated to the purpose of the online meeting, for example. To do so, user 508 can select the "Relevancy" button to indicate a start of an unimportant segment of the online meeting. In response to user 508 selecting the "Relevancy" button, media editor 516 can generate a nonsense start tag that includes a timestamp that records a specific point in time within the online meeting, and input the generated nonsense start tag to the control panel. The point in time recorded in the nonsense start tag is a start of an unimportant segment within the online meeting. User 508 can then select the "Relevancy" button again to indicate a corresponding end of the unimportant segment of the online meeting. In response to user 508 selecting the "Relevancy" button again, media editor 516 can generate a nonsense end tag that includes a timestamp that records a specific point in time within the online meeting and input the generated nonsense end tag to the control panel. The point in time recorded in the nonsense end tag is an end of an unimportant segment within the online meeting. In this manner, user 508 may use the "Relevancy" button to indicate one or more segments of the online meeting that are not important or off topic.

In some embodiments, media editor 516 is configured to generate notes from the items of content input to the control panel. In such embodiments, the individual notes are comprised of one or more items of content input to the control panel. The individual notes are also linked to or otherwise associated with a point in time within an online meeting at which a specific note is generated. Associating a generated note with a specific point in time within the online meeting allows for using the note to navigate to a certain point in time within a recording of an online meeting during the playback of the recording of the online meeting. In an example implementation, media editor 516 may ascertain the specific point in time from meeting application 504 (i.e., a meeting application that is being used to host the online meeting), and maintain a mapping of the notes to their corresponding points in time at which the note is generated. In some such embodiments, individual notes may be associated with an annotation marker on a timeline bar showing a position of the note within a recording of the online meeting. Associating a generated note with an annotation marker on a timeline bar allows for visually ascertaining a location of the note within the recording of the online meeting and using the annotation marker as a control to access the note during the playback of the recording of the online meeting.

In some embodiments, media editor 516 generates and stores a note after passage of a period of time (e.g., predetermined period of idle input time during which no input is provided to the control panel). Generating the notes in this manner may provide for improved continuity of within individual notes and between the various notes since the one or more items of content within the individual notes are likely to be related due to their temporal relationship. In one example, a predetermined period of idle input time may be set to a suitable value, such as 4 minutes, 5 minutes, 6 minutes, or any other suitable duration, and may be tunable based on a desired performance. For instance, setting the predetermined period to a longer duration may result in the generation of notes that include a larger number of items of content, as compared to setting the predetermined period to a shorter duration which may result in the generation of notes that include a smaller number of items of content.

To this end, in an illustrative implementation, media editor 516 may utilize an idle timer set to a specific period of time (i.e., the set value of the predetermined period of idle input time such as, for example, 5 minutes). Media editor 516 may then monitor the control panel for inputting of items of content. Upon detecting an end or completion of an occurrence of an inputting of an item of content to the control panel (e.g., a user finishes inputting an item of content), media editor 516 may start the idle timer. Conversely, upon detecting a start of an occurrence of an inputting of an item of content to the control panel (e.g., a user starts inputting an item of content), media editor 516 may stop the idle timer. When the timer expires at the end of the specific period of time, media editor 516 may generate a note comprised of the items of content input to the control panel and store the generated note in database 518. Media editor 516 may then reset the idle timer. In some implementations, media editor 516 may clear the control panel of the previously input items of content (i.e., the input items of content included in the generated note).

In some embodiments, media editor 516 may generate a record (e.g., a note metadata record) for individual notes and store the record in database 518. The record describes a stored note and can be used as a reference file when accessing or otherwise using a stored note. In an illustrative implementation, a record may include a note identifier, a meeting identifier, a note timestamp, and one or more content items. The note identifier is a universally unique identifier (uuid) that identifies a specific note. The meeting identifier is a uuid that identifies a specific online meeting to which the note belongs or is otherwise associated. The note timestamp records a specific point in time within the online meeting at which the note is generated (i.e. a relative time during the online meeting at which the note is generated). The one or more content items are the item or items of content (e.g., text, images, etc.) included in the note.

In some embodiments, media editor 516 may generate and maintain a record (e.g., a meeting metadata record) for individual online meetings in which media editor 516 is utilized to generate one or more notes for a specific online meeting. The record describes an online meeting and can be used as a reference file when accessing or otherwise using a recording of the online meeting. In an illustrative implementation, the record may include a meeting identifier, a meeting time, one or more note identifiers, a meeting duration, and a meeting recording. The meeting identifier is a uuid that identifies a specific online meeting. The meeting time is a timestamp that records a specific time (e.g., date and time) at which the online meeting occurred. The one or more note identifiers are uuids that identify the one or more notes associated with the online meeting. The meeting duration indicates the duration of the online meeting. The meeting recording is a link to a video or audio recording of the online meeting.

A database (e.g., a meeting database) 518 may include any suitable digital storage device configured to store digitally encoded data. Database 518 may be configured to facilitate storage and access of the generated notes, the records, the items of content, and other data related to meeting interface 514.

In some embodiments, recording player 520 is configured to manage the playback of a recording of an online meeting with the notes generated for the online meeting using media editor 516. To this end, recording player 520 may provide a user interface that includes a recording viewing panel and a notes panel. The recording viewing panel is configured to display the video content of a recording of an online meeting. In the case of an audio recording where a video content does not exist, the recording viewing panel may display a visual representation of the audio content of the recording.

The recording viewing panel may include a timeline bar and controls, such as a play button, a stop button, a pause button, and other controls, for controlling the playback of a recording of an online meeting. The timeline bar may include a playback handle that indicates, relative to the length of the timeline bar, a point in the recording which is currently being played. In other words, the playback handle indicates relatively what portion of the content of the recording is currently being displayed in the recording viewing panel. In some embodiments, recording player 520 may generate an annotation marker for the individual notes associated with the online meeting and link the annotation marker to a corresponding note. In an example implementation, recording player 520 may maintain mappings between the annotation markers and the individual notes, including the items of content included in the individual notes. Recording player 520 may then display the annotation markers at relative locations over the timeline bar to indicate a point in time within the online meeting at which a corresponding note is generated. In this way, an annotation marker provides a visual indication of the relative location of a corresponding note within the recording of the online meeting. The annotation marker also provides a visual indication of the availability of the corresponding note. In some such embodiments, the annotation marker may be provided as actionable user interface element that can be selected to cause the display of the corresponding note in the notes panel.

The notes panel is configured to display the notes, including the items of content comprising the notes, associated with the online meeting whose recording is being played in the recording viewing panel. In some embodiments, recording player 520 may link the notes to corresponding annotation markers. As previously explained, the annotation markers are displayed at relative locations over the timeline bar to indicate a point in time within the online meeting at which a corresponding note is generated. In some such embodiments, the displayed note and/or one or more items of content included in the note may be provided as actionable user interface element(s) that can be selected to cause the content of the recording corresponding to the displayed note to play. In other words, selecting a displayed note and/or an item of content included in the note causes the recording to play from the point in time indicated by the corresponding annotation marker. In this way, the notes can be displayed and viewed in context, which allows for easy and improved correlation of the individual notes and the corresponding content of the recording of the online meeting.

In some embodiments, recording player 520 is configured to edit a recording of an online meeting to clip or otherwise remove the unimportant segments from the recording. As explained above, certain segments of an online meeting may have been indicated as being not important or off topic using the "Relevancy" button feature of media editor 516. In an illustrative implementation, upon retrieving a recording of an online meeting, recording player 520 may search the notes associated with the online meeting for notes that indicate unimportant segments. In other words, recording player 520 may search the notes associated with the online meeting for notes that include a nonsense start tag and a nonsense end tag pair. If any such notes are found, recording player 520 can identify the segment or segments of the recording indicated as being unimportant, and edit the recording to remove the identified unimportant segment or segments from the recording. Recording player 520 can determine the segments to remove based on the timestamps included in the nonsense start tag(s) and the nonsense end tag(s). Recording player 520 may then present the notes with the edited recording of the online meeting. Note that recording player 520 may also adjust the timestamps associated with the notes and the annotation markers to account for the editing (i.e., removal of the unimportant segments) performed on the recording of the online meeting. For example, suppose a timestamp of a note indicates that the note is generated at the 50 minute point (or point in time) of the online meeting, and that an indicated unimportant segment starts at the 10 minute point and ends at the 20 minute point of the online meeting. In this example case, recording player 520 can edit the recording of the online meeting to remove the unimportant segment (i.e., the 10 minute segment of the recording from the 10 minute point to the 20 minute point), and adjust the timestamp of the note to indicate 40 minutes (i.e., 50 minute point—10 minute segment removed from the recording) to account for the reduction in the length of the recording.

In some embodiments, recording player 520 is configured to generate recording clips of important or highlighted segments of a recording of an online meeting. As explained above, certain segments of an online meeting may have been indicated as being important using the "Highlights" button feature of media editor 516. In an illustrative implementation, upon retrieving a recording of an online meeting, recording player 520 may search the notes associated with the online meeting for notes that indicate important or highlighted segments. In other words, recording player 520 may search the notes associated with the online meeting for notes that include a highlight start tag and a highlight end tag pair. If any such notes are found, recording player 520 can identify the segment or segments of the recording indicated as being important, and generate a recording clip for the individual important segments of the recording. Recording player 520 can determine the segments of the recording to use in generating the recording clips based on the timestamps included in the highlight start tag(s) and the highlight end tag(s). Recording player 520 may then include links to the individual recording clips in the corresponding notes. Then, when a note that includes a link to an important clip of the recording is displayed during playback of the recording, a user can select the link to access the important clip of the recording.

Figure 6:
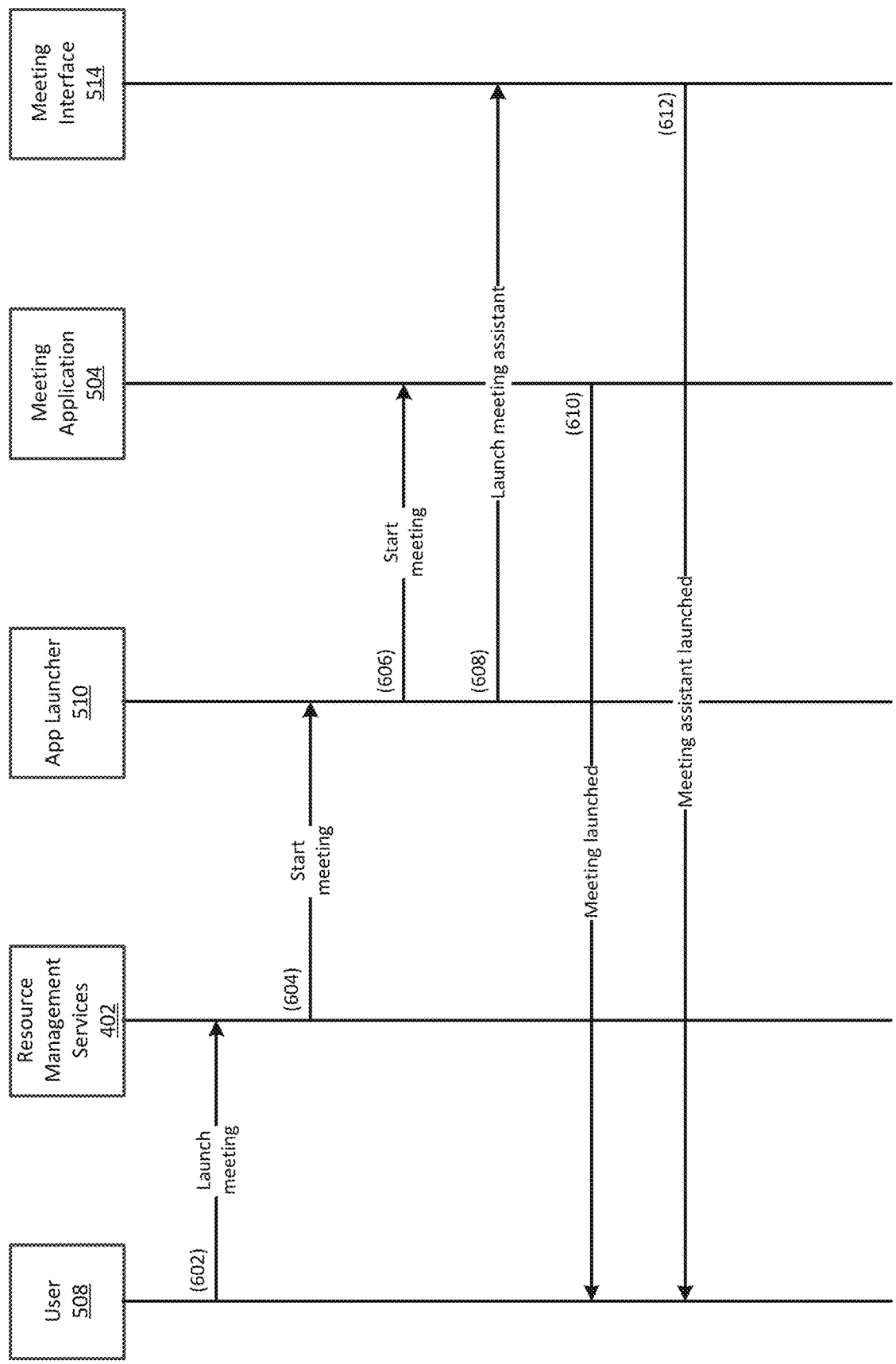
FIG. 6 is a diagram illustrating various interactions between selected components to launch an online meeting with a meeting interface, in accordance with an embodiment of the present disclosure.

FIG. 6 is a diagram illustrating various interactions between selected components to launch an online meeting with a meeting interface, in accordance with an embodiment of the present disclosure. For example, referring to both FIG. 5 and FIG. 6, user 508 may use an instance of resource access application 424 executing on client device 502 to access resources provided by resource management services 402. In this example, resource access application 424 may provide a user interface element, such as an icon or an input dialog box, that allows a user (e.g., user 508) to launch a meeting application (e.g., meeting application 504). To participate in a scheduled online meeting, user 508 can use the provided user interface element to send (602) to resource management services 402 a command to launch meeting application 504 and join the scheduled online meeting. User 508 may provide the details regarding the scheduled online meeting when launching meeting application 504.

In response to receipt of the command, resource management services 402 can send (604) to application launcher 510 a command to start the scheduled online meeting and join user 508 to the online meeting. In response, application launcher 510 can send (606) to meeting application 504 a command to start the scheduled online meeting and join user 508. Application launcher 510 can also send (608) to meeting interface 514 a command to launch.

Upon starting the scheduled meeting and joining user 508, meeting application 504 can send (610) to user 508 (i.e., resource access application 424 on client device 502) an indication or a notification that the requested online meeting is launched and user 508 is successfully joined to the online meeting.

Upon launching in response to the command from application launcher 510, meeting interface 514 can send (612) to user 508 (i.e., resource access application 424 on client device 502) a notification that meeting interface 514 is launched and available for use by user 508. In an illustrative implementation, meeting interface 514 may display a user interface element, such as a message box, asking whether media editor 516 is to be launched. Meeting interface 514 may also display controls, such as buttons (e.g., "Yes" button and "No" button), in the message box which can be selected to either launch media editor 516 or not launch media editor 516. For example, user 508 can then select the button (e.g., "Yes" button) to launch media editor 516. User 508 may then use media editor 516 to add notes during the online meeting.

In some embodiments, media editor 516 may be launched and used independent of meeting application 504 (i.e., independent of an online meeting). For example, user 508 may launch meeting interface 514 and use media editor 516 to annotate a recording of an online meeting.

Figure 7:
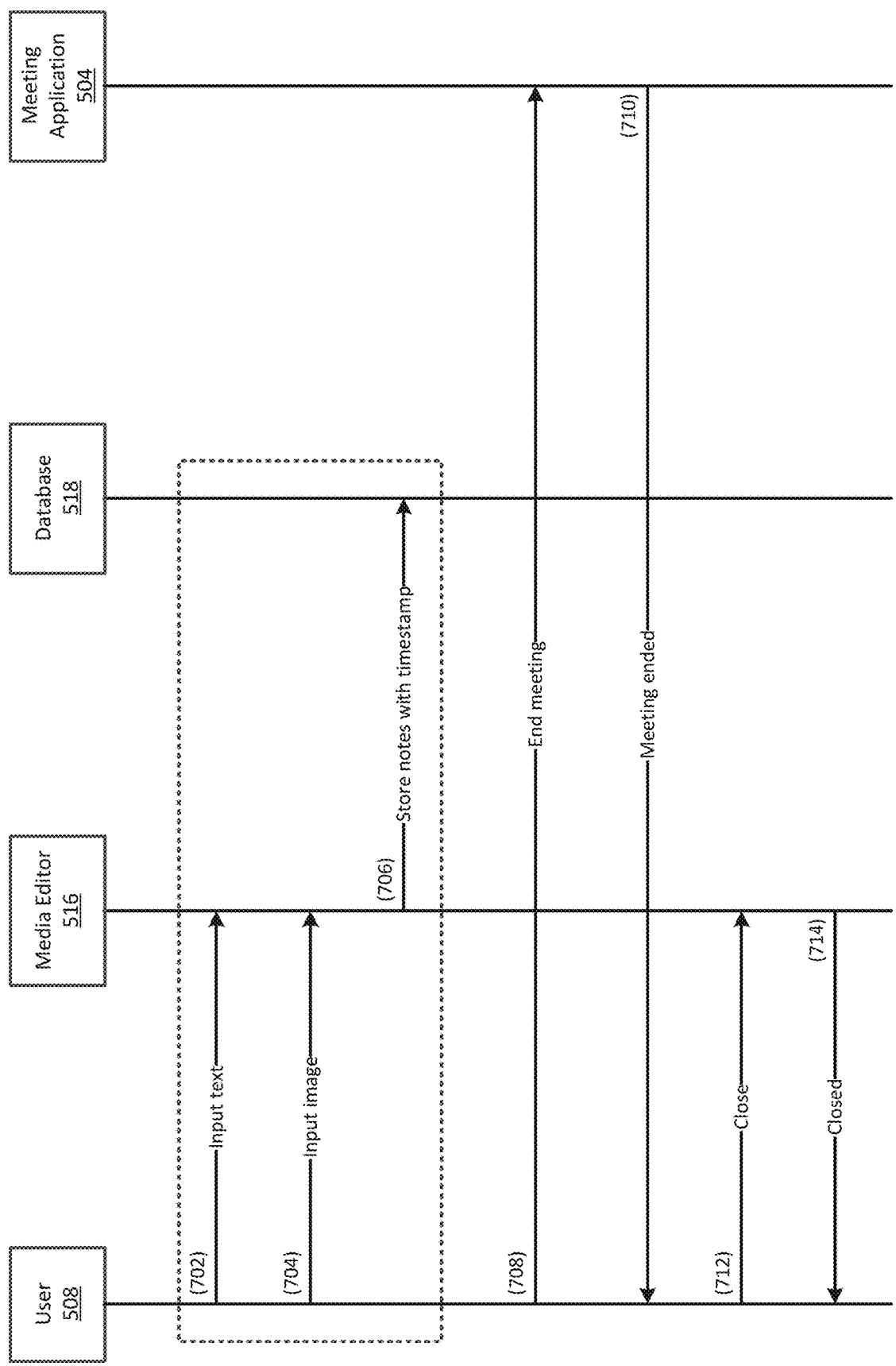
FIG. 7 is a diagram illustrating various interactions between selected components to add notes during an online meeting, in accordance with an embodiment of the present disclosure.

FIG. 7 is a diagram illustrating various interactions between selected components to add notes during an online meeting, in accordance with an embodiment of the present disclosure. Continuing the example above, user 508 may use an instance of resource access application 424 executing on client device 502 to participate in an online meeting. To enable the adding of notes during the online meeting, user 508 may have lunched media editor 516. At a specific point during the online meeting, user 508 can input (702) to media editor 516 text to add a comment in the form of text (e.g., text comment). At another point during the online meeting, user 508 can input (704) to media editor 516 an image to add a comment in the form of an image (e.g., comment that includes an image). User 508 may continue to input to media editor 516 items of content during the online meeting or while viewing a recording of the meeting.

At various points during the online meeting, media editor 516 can generate a note from the items of content input to media editor 516 by user 508. A generated note may include the items of content input by user 508 during the online meeting (or while viewing the recorded meeting) up to the point in time media editor 516 generates the note. In an illustrative implementation, media editor 516 can generate a note after passage of a period of time (e.g., a predetermined period of idle input time during which no input is provided to media editor 516). Upon generating a note, media editor 516 can store (706) the generated note with a timestamp in database 518. Note that media editor 516 may generate and store one or more notes during the online meeting or while viewing a recording of the meeting.

To leave the online meeting, user 508 can send (708) to meeting application 504 a command to end the online meeting. For example, user 508 may select a control provided on a user interface of meeting application 504 to leave the online meeting. In response to the command, meeting application 504 can end the participation of user 508 in the online meeting and send (710) to user 508 (i.e., resource access application 424 on client device 502) an indication or a notification that the online meeting has ended. User 508 can then send (712) to media editor 516 a command to close the editor. In response to the command, media editor 516 can send (714) to user 508 (i.e., resource access application 424 on client device 502) an indication or a notification that the editor is closed and stop executing. In the example case where user 508 is viewing a recording of the meeting, user 508 can send to an application that is being utilized to view the recording a command to close or terminate the application, In response to the command, the application can send to user 508 an indication or a notification of the closure of the application.

Figure 8:
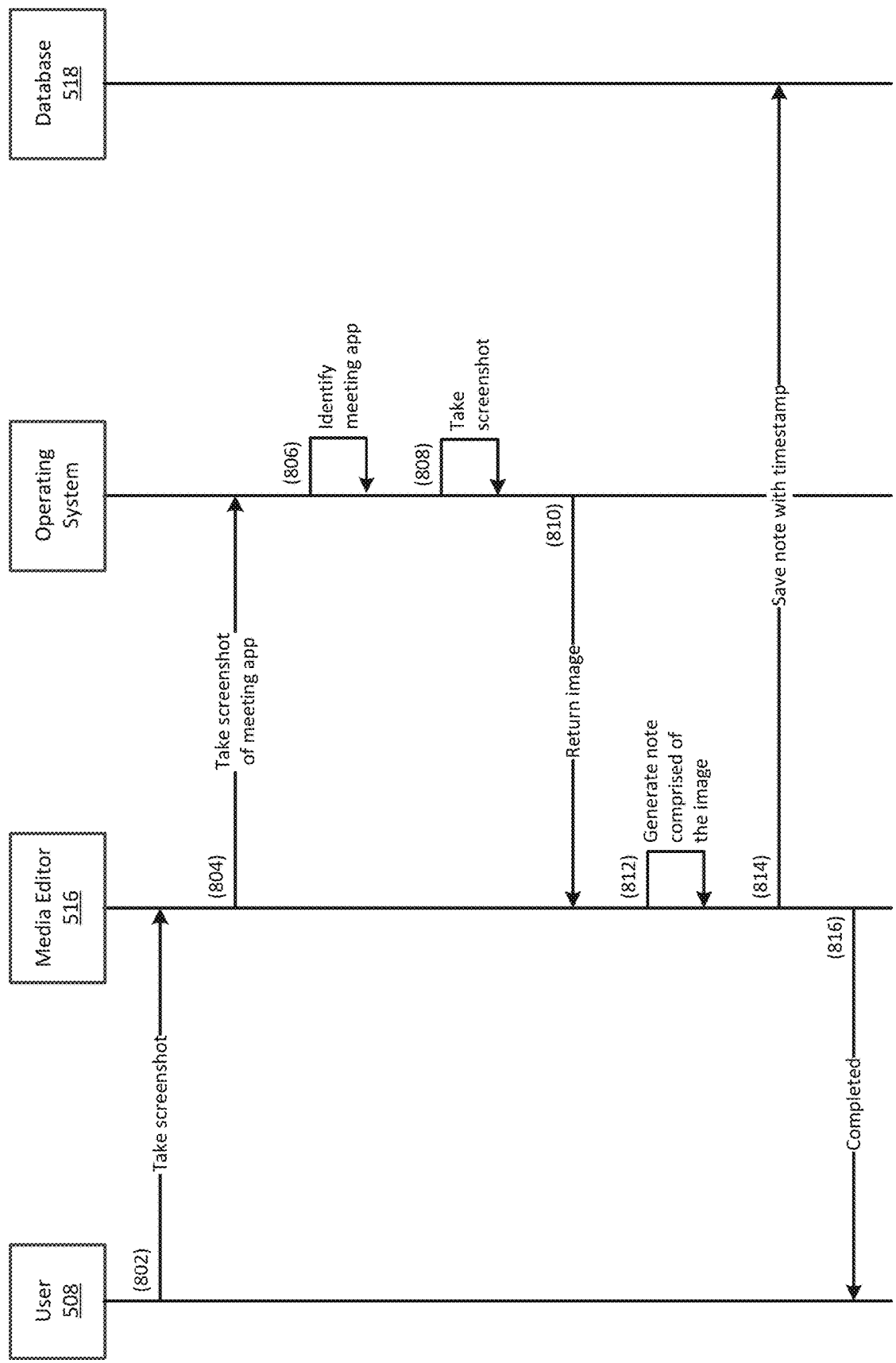
FIG. 8 is a diagram illustrating various interactions between selected components to input a screen shot of a window of a meeting application, in accordance with an embodiment of the present disclosure.

FIG. 8 is a diagram illustrating various interactions between selected components to input an image (e.g., a screen shot of a window of a meeting application), in accordance with an embodiment of the present disclosure. Continuing the example above, user 508 may use an instance of resource access application 424 executing on client device 502 to participate in an online meeting. To enable the adding of notes during the online meeting, user 508 may have launched media editor 516. At a specific point during the online meeting, user 508 can input (802) to media editor 516 a command to take an image (e.g., a screenshot of a current window) of a meeting application that is being used to host the online meeting.

In response to the command, media editor 516 can send (804) to the operating system a command to take an image of the current window of a meeting application that is being used to host the online meeting. In an example implementation, media editor 516 may utilize a print screen feature provided by the operating system. In response, the operating system may take an image of the contents (e.g., windows) displayed on the screen of client device 502. The operating system or, in some cases media editor 516, may present to user 508 the image of the contents of the screen, and user 508 may select or otherwise indicate the contents to include in the requested image. The operating system may then modify the image to include the contents indicated by user 508. In response to the command, the operating system can identify (806) the meeting application that is being used to host the online meeting. For instance, the operating system may identify the window that is open and active (e.g., being used by user 508) on client device 502 as being associated with the meeting application. In this example case, the operating system may identify meeting application 504 as the meeting application that is being used to host the online meeting. Upon identifying the meeting application, the operating system can take (808) an image of the current window of the meeting application. In an illustrative implementation, to take an image of the current window of the meeting application, the operating system may take an image of the content of the online meeting that is being displayed in the user interface of media editor 516. The operating system can then return (810) to media editor 516 the image of the content of the online meeting that is being displayed in the user interface of media editor 516.

Upon receiving the image, media editor 516 can generate (812) a note the includes the image. Media editor 516 can then store (814) the generated note with a timestamp in database 518. Media editor 516 can then send (816) to user 508 (i.e., resource access application 424 on client device 502) an indication or a notification that the image of the current window of the meeting application was successfully taken.

Figure 9:
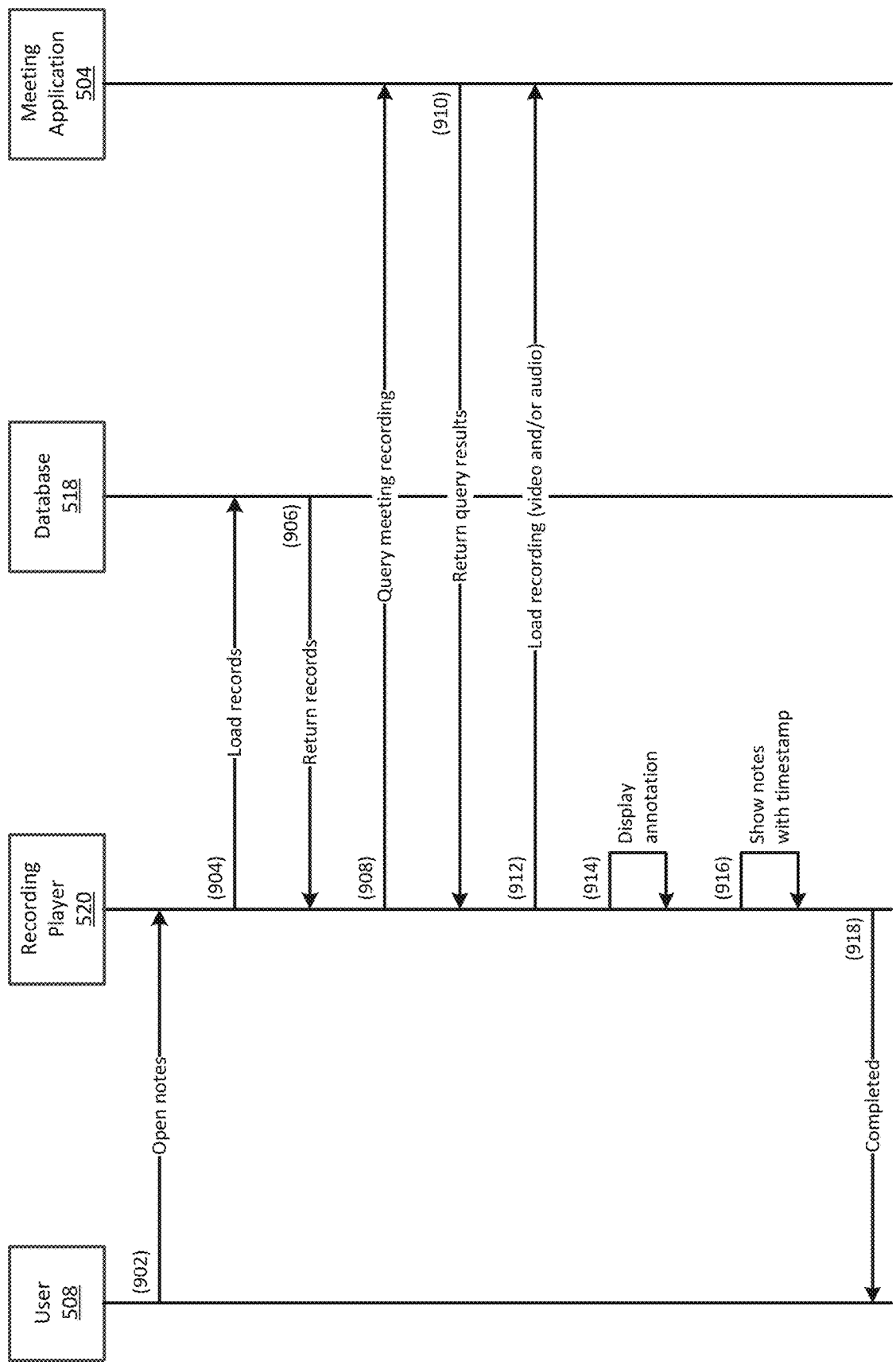
FIG. 9 is a diagram illustrating various interactions between selected components to view stored notes for an online meeting, in accordance with an embodiment of the present disclosure.

FIG. 9 is a diagram illustrating various interactions between selected components to view stored notes for an online meeting, in accordance with an embodiment of the present disclosure. For example, user 508 may use an instance of resource access application 424 executing on client device 502 to access resource management services 402 to view the notes generated for an online meeting. In this example, resource access application 424 may provide a user interface element, such as an icon or an input dialog box, that allows user 508 to launch meeting interface 514 and recording player 520. Upon launching meeting interface 514 and recording player 520, user 508 can use the provided user interface element to specify the notes to open and send (902) to recording player 520 a command to open the specified notes.

In response to the command, recording player 520 can send (904) to database 518 a command to load the records associated with the specified notes. In response, database 518 can return (906) to recording player 520 the records associated with the notes. Recording player 520 can then send (908) to meeting application 504 a query to determine whether a recording of the online meeting associated with the specified notes is available. For example, meeting application 504 may or may not have generated a recording of the online meeting associated with the notes user 508 wants to view. Assuming that a recording of the online meeting is available, meeting application 504 can send (910) to recording player 520 a response indicating that a recording of the online meeting is available. In response, recording player 520 can send (912) to meeting application 504 a command to load the recording of the online meeting for playback.

Recording player 520 can then generate an annotation marker for the individual notes and link the annotation marker to the corresponding note. Upon generating the annotation makers, recording player 520 can display (914) the annotation markers at relative locations over a timeline bar to indicate a point in time within the online meeting at which a corresponding note is generated. In an illustrative implementation, recording player 520 may display the timeline bar and the annotation markers in its user interface. Recording player 520 can show (916) one or more of the notes with their timestamps, for example, in its user interface for viewing by user 508. When user 508 is finished viewing the notes, user 508 may send a command to close recording player 520. In response to the command, recording player 520 can send (918) to user 508 (i.e., resource access application 424 on client device 502) an indication or a notification that the player is closed and stop executing.

Figure 10:
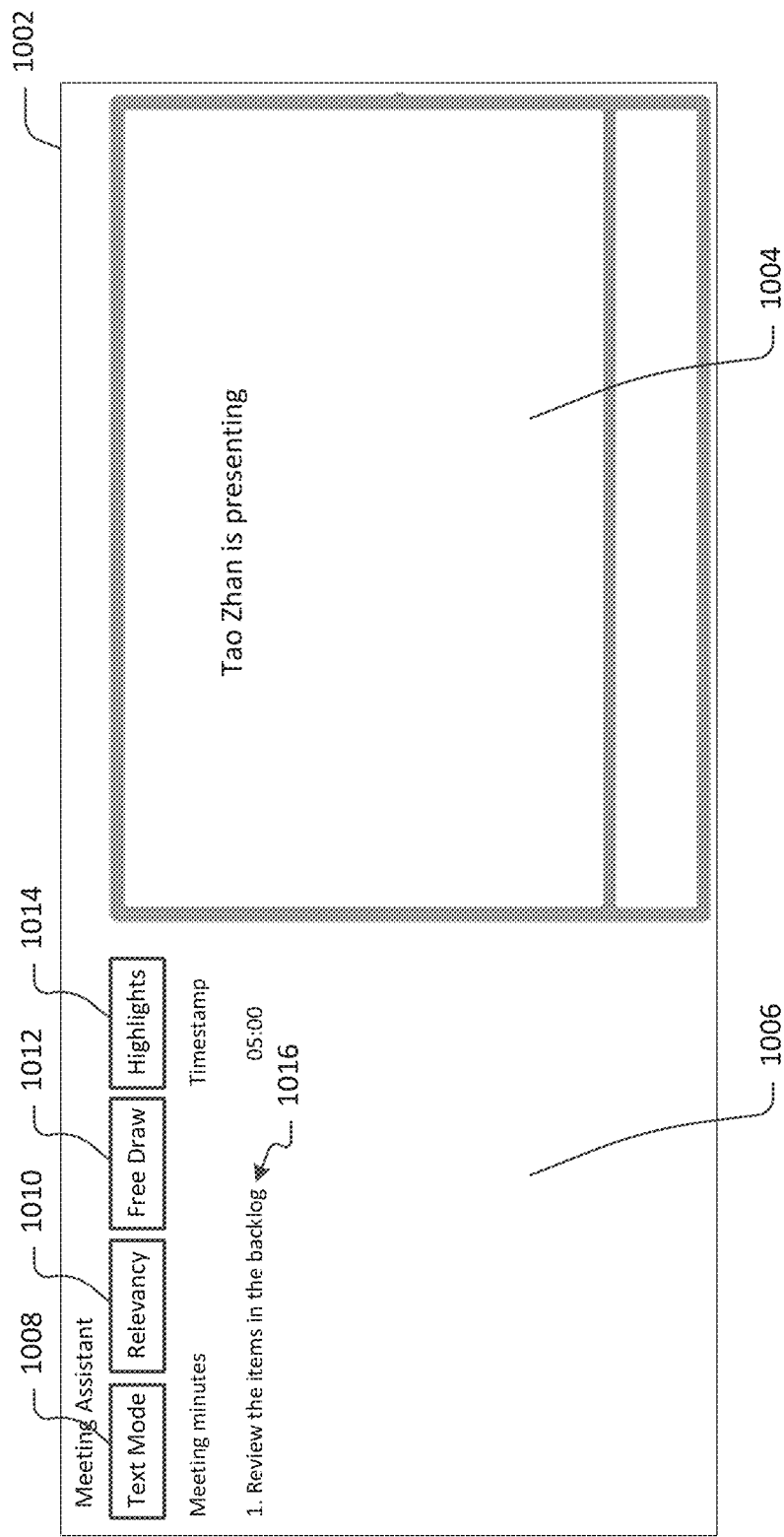
FIG. 10 shows a user interface, in accordance with an embodiment of the present disclosure.

FIG. 10 shows a user interface 1002, in accordance with an embodiment of the present disclosure. User interface 1002 may be displayed to user 508 on client device 502 upon launching of media editor 516. In an illustrative implementation, user interface 1002 may include a content panel 1004 and a control panel 1006. Content panel 1004 is configured to display content of an online meeting for viewing by user 508, for example. Control panel 1006 is configured to receive items of content input by the user 508.

As shown in FIG. 10, user interface 1002 may include a "Text Mode" button 1008, a "Relevancy" button 1010, a "Free Draw" button 1012, and a "Highlights" button 1014. In operation, "Text Mode" button 1008 may be selected to input to control panel 1006 media content in the form of text, "Relevancy" button 1010 may be selected to input to control panel 1006 an indication of an unimportant segment of the online meeting, "Free Draw" button 1012 may be selected to input to control panel 1006 media content in the form of an image, and "Highlights" button 1014 may be selected to input to control panel 1006 an indication of an important segment of the online meeting. In an example implementation, "Free Draw" button 1012 may be selected to access a digital whiteboard that is provided in a portion, such as the lower portion, of control panel 1006. A drawing instrument, such as a digital pen, may then be used to draw or doodle on the digital whiteboard, and the contents of the digital whiteboard may be captured as an image.

As can be seen in FIG. 10, control panel 1006 displays a text comment 1016 (as indicated by "Review the items in the backlog") with a timestamp of "05:00". The displayed timestamp indicates a point in time within the online meeting of the input of the corresponding text comment 1016. For example, user 508 may have selected "Text Mode" button 1008 and input to control panel 1006 text comment 1016 at the 5 minute point of the online meeting.

Figure 11A:
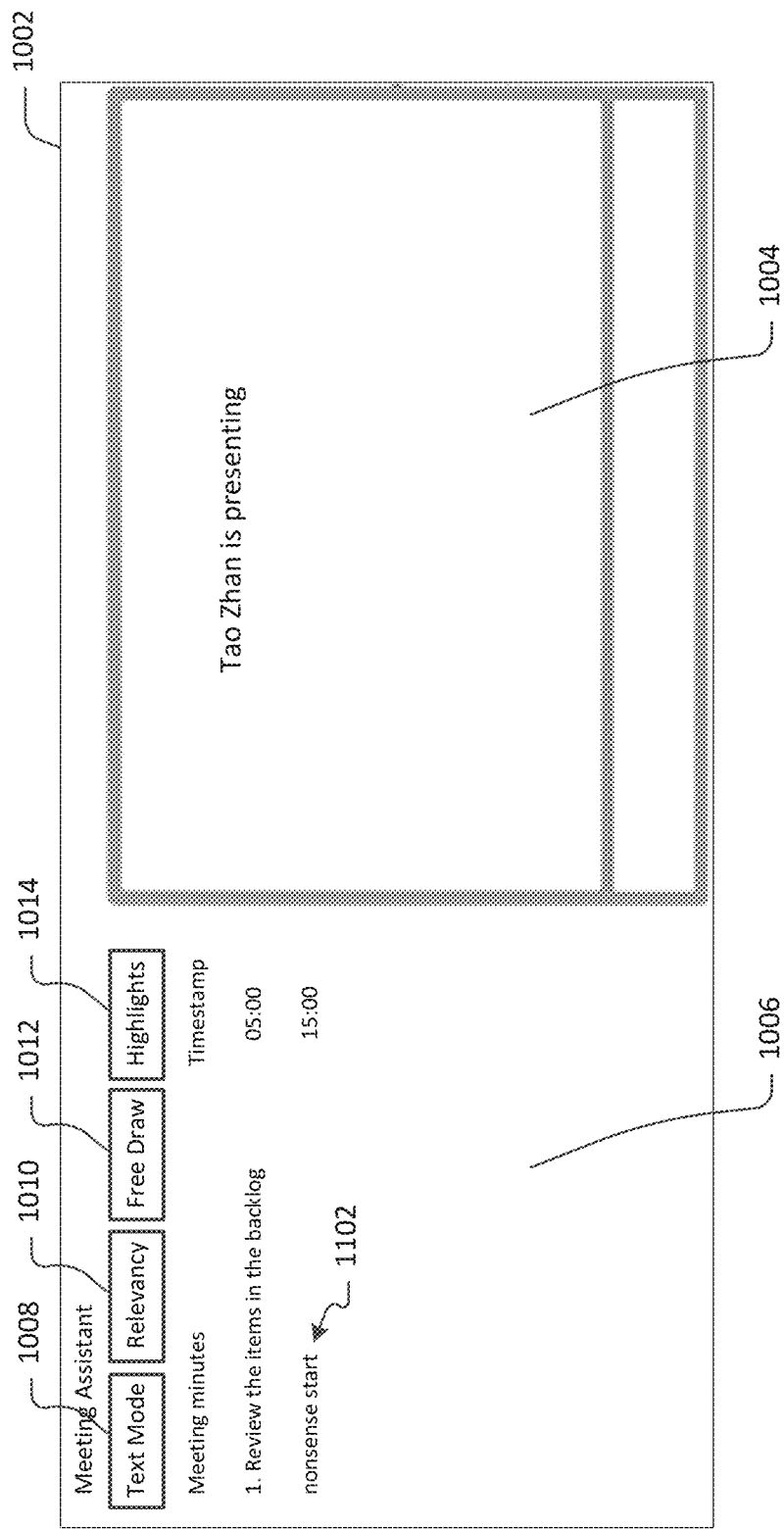
FIGS. 11A and 11B show a user interface illustrating relevancy functionality, in accordance with an embodiment of the present disclosure.
Figure 11B:
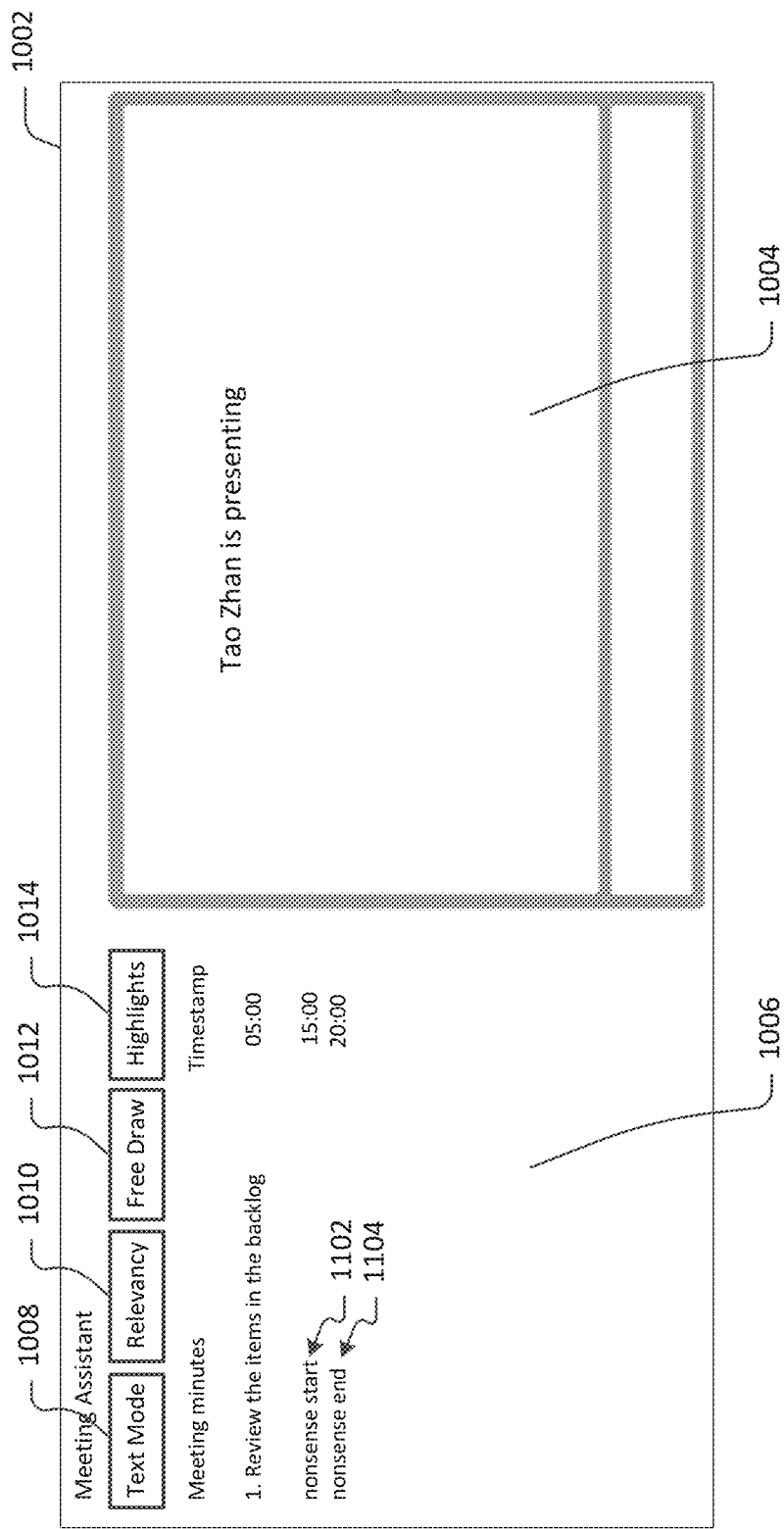

FIGS. 11A and 11B show user interface 1002 illustrating nonsense functionality, in accordance with an embodiment of the present disclosure. As can be seen in FIG. 11A, control panel 1006 displays a nonsense start tag 1102 (as indicated by "nonsense start") with a timestamp of "15:00". The displayed timestamp indicates a point in time within the online meeting of the input of the corresponding nonsense start tag 1102. The displayed nonsense start tag 1102 indicates a start of an unimportant segment within the online meeting. For example, user 508 may have selected "Relevancy" button 1010 to indicate a start of an unimportant segment of the online meeting at a 15 minute point of the online meeting. In response, media editor 516 can generate and display in control panel 1006 nonsense start tag 1102 with the timestamp of "15:00".

As can be seen in FIG. 11B, control panel 1006 displays a nonsense end tag 1104 (as indicated by "nonsense end") with a timestamp of "20:00". The displayed timestamp indicates a point in time within the online meeting of the input of the corresponding nonsense end tag 1104. The displayed nonsense end tag 1104 indicates an end of an unimportant segment within the online meeting. For example, after selecting "Relevancy" button 1010 at the 15 minute point of the online meeting to indicate the start of an unimportant segment, user 508 may have selected "Relevancy" button 1010 to indicate an end of the unimportant segment of the online meeting at a 20 minute point of the online meeting. In response, media editor 516 can generate and display in control panel 1006 nonsense end tag 1104 with the timestamp of "20:00". The displayed nonsense start tag 1102 and nonsense end tag 1104 pair provides an indication of an unimportant segment beginning at the 15 minute point and ending at the 20 minute point of the online meeting.

In an illustrative implementation, "Relevancy" button 1010 may be displayed in differing colors to indicate a state of "Relevancy" button 1010. For instance, "Relevancy" button 1010 may initially be displayed in a first color. Then, upon being selected to input an indication of a start of an unimportant segment, "Relevancy" button 1010 may be displayed in a second color that is different than the first color. Displaying "Relevancy" button 1010 in the second color may provide a visual indication to user 508 that an indication of a start of an unimportant segment was input and that the next selection of "Relevancy" button 1010 will cause an indication of an end of an unimportant segment to be input. Accordingly, upon the next selection of "Relevancy" button 1010, an indication of an end of an unimportant segment may be input and "Relevancy" button 1010 may be displayed in the first color. In this manner, the display of "Relevancy" button 1010 may alternate between the first color and the second color.

Figure 12A:
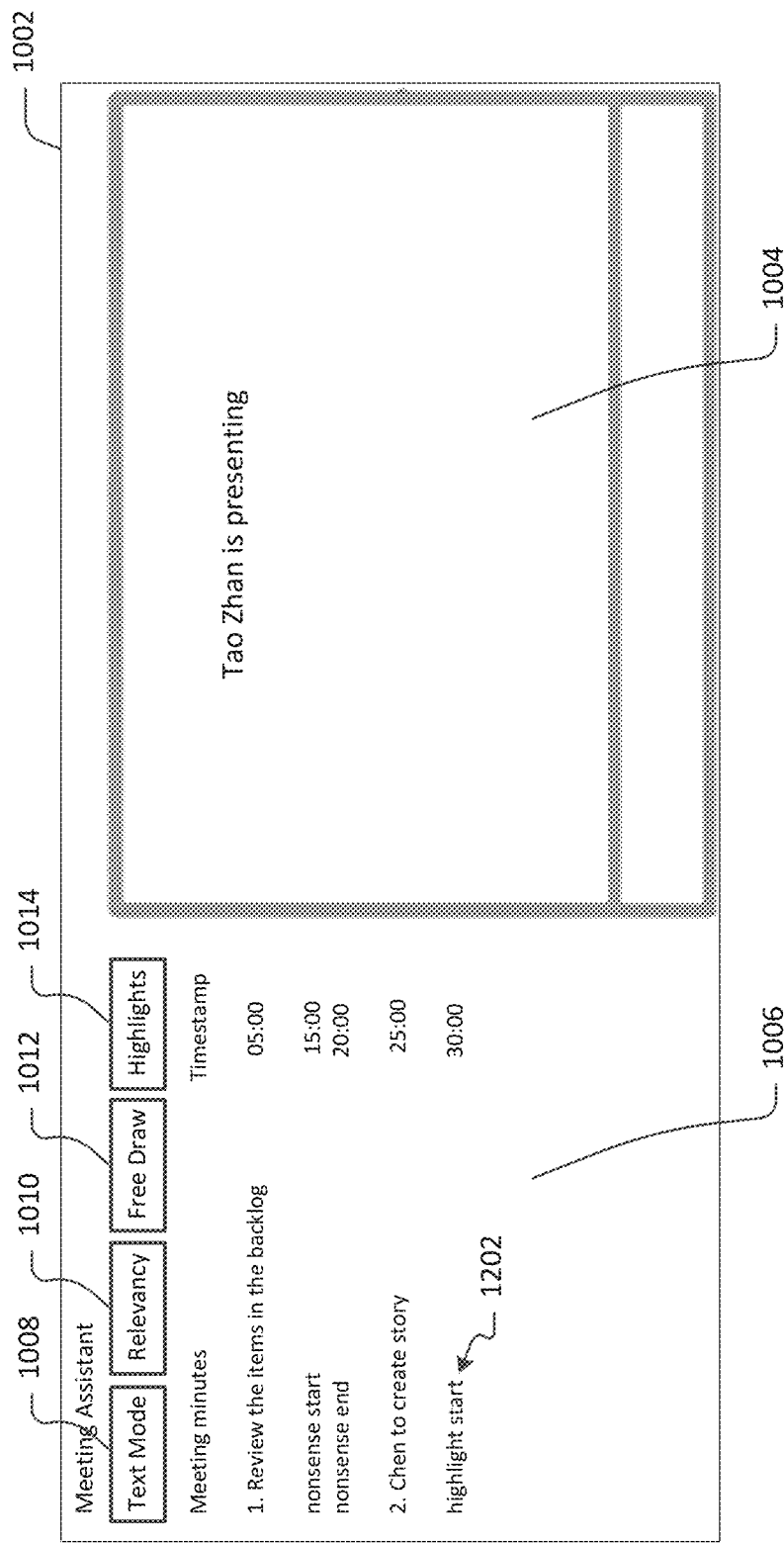
FIGS. 12A and 12B show a user interface illustrating highlight functionality, in accordance with an embodiment of the present disclosure.
Figure 12B:
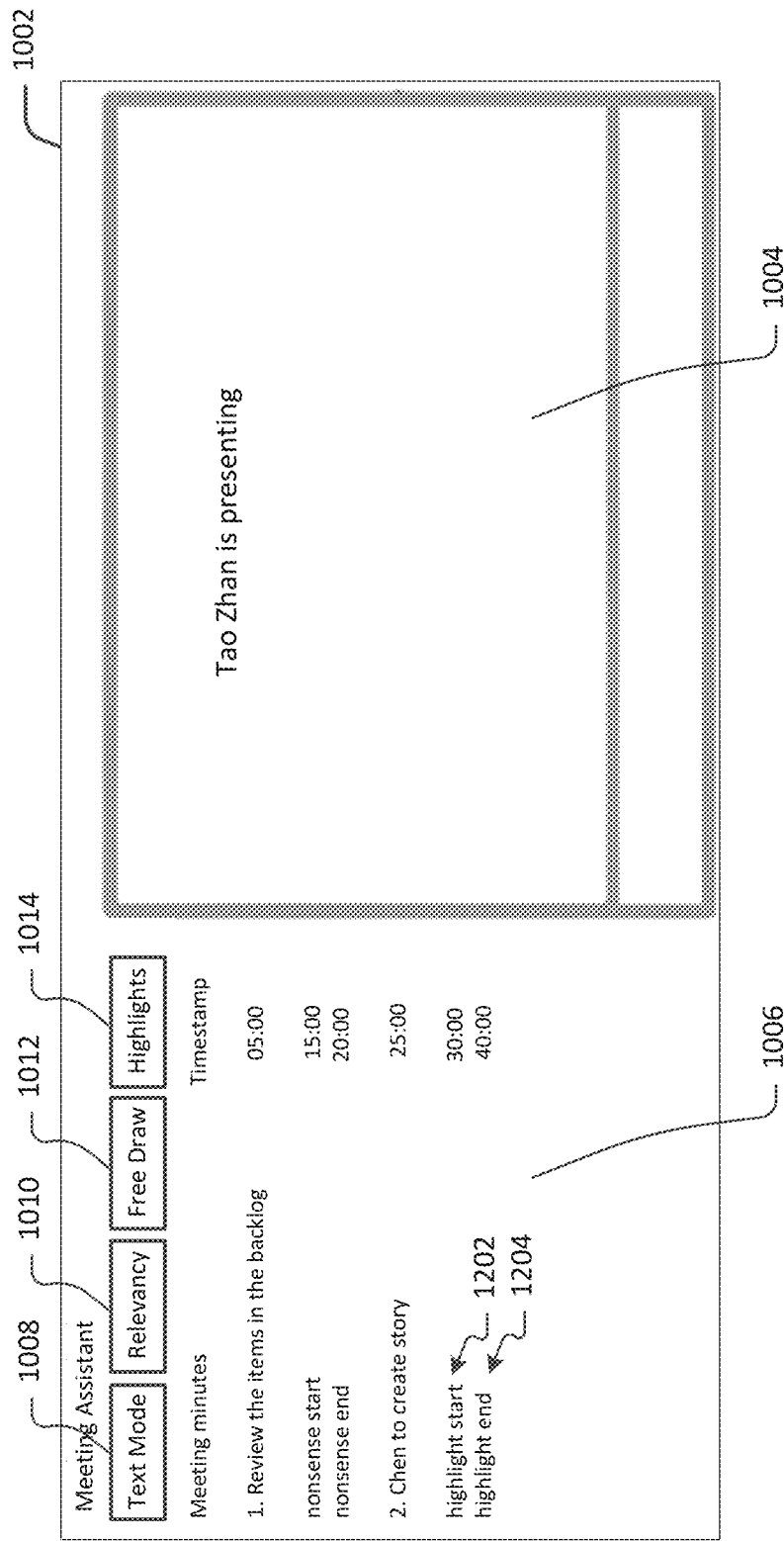

FIGS. 12A and 12B show user interface 1002 illustrating highlight functionality, in accordance with an embodiment of the present disclosure. As can be seen in FIG. 12A, control panel 1006 displays a highlight start tag 1202 (as indicated by "highlight start") with a timestamp of "30:00". The displayed timestamp indicates a point in time within the online meeting of the input of the corresponding highlight start tag 1202. The displayed highlight start tag 1202 indicates a start of an important segment within the online meeting. For example, user 508 may have selected "Highlights" button 1014 to indicate a start of an important segment of the online meeting at a 30 minute point of the online meeting. In response, media editor 516 can generate and display in control panel 1006 highlight start tag 1202 with the timestamp of "30:00".

As can be seen in FIG. 12B, control panel 1006 displays a highlight end tag 1204 (as indicated by "highlight end") with a timestamp of "40:00". The displayed timestamp indicates a point in time within the online meeting of the input of the corresponding highlight end tag 1204. The displayed highlight end tag 1204 indicates an end of an important segment within the online meeting. For example, after selecting "Highlights" button 1014 at the 30 minute point of the online meeting to indicate the start of an important segment, user 508 may have selected "Highlights" button 1014 to indicate an end of the important segment of the online meeting at a 40 minute point of the online meeting. In response, media editor 516 can generate and display in control panel 1006 highlight end tag 1204 with the timestamp of "40:00". The displayed highlight start tag 1202 and highlight end tag 1204 pair provides an indication of an important segment beginning at the 30 minute point and ending at the 40 minute point of the online meeting.

In an illustrative implementation, "Highlights" button 1014 may be displayed in differing colors to indicate a state of "Highlights" button 1014. For instance, "Highlights" button 1014 may initially be displayed in a first color. Then, upon being selected to input an indication of a start of an important segment, "Highlights" button 1014 may be displayed in a second color that is different than the first color. Displaying "Highlights" button 1014 in the second color may provide a visual indication to user 508 that an indication of a start of an important segment was input and that the next selection of "Highlights" button 1014 will cause an indication of an end of an important segment to be input. Accordingly, upon the next selection of "Highlights" button 1014, an indication of an end of an important segment may be input and "Highlights" button 1014 may be displayed in the first color. In this manner, the display of "Highlights" button 1014 may alternate between the first color and the second color.

Figure 13A:
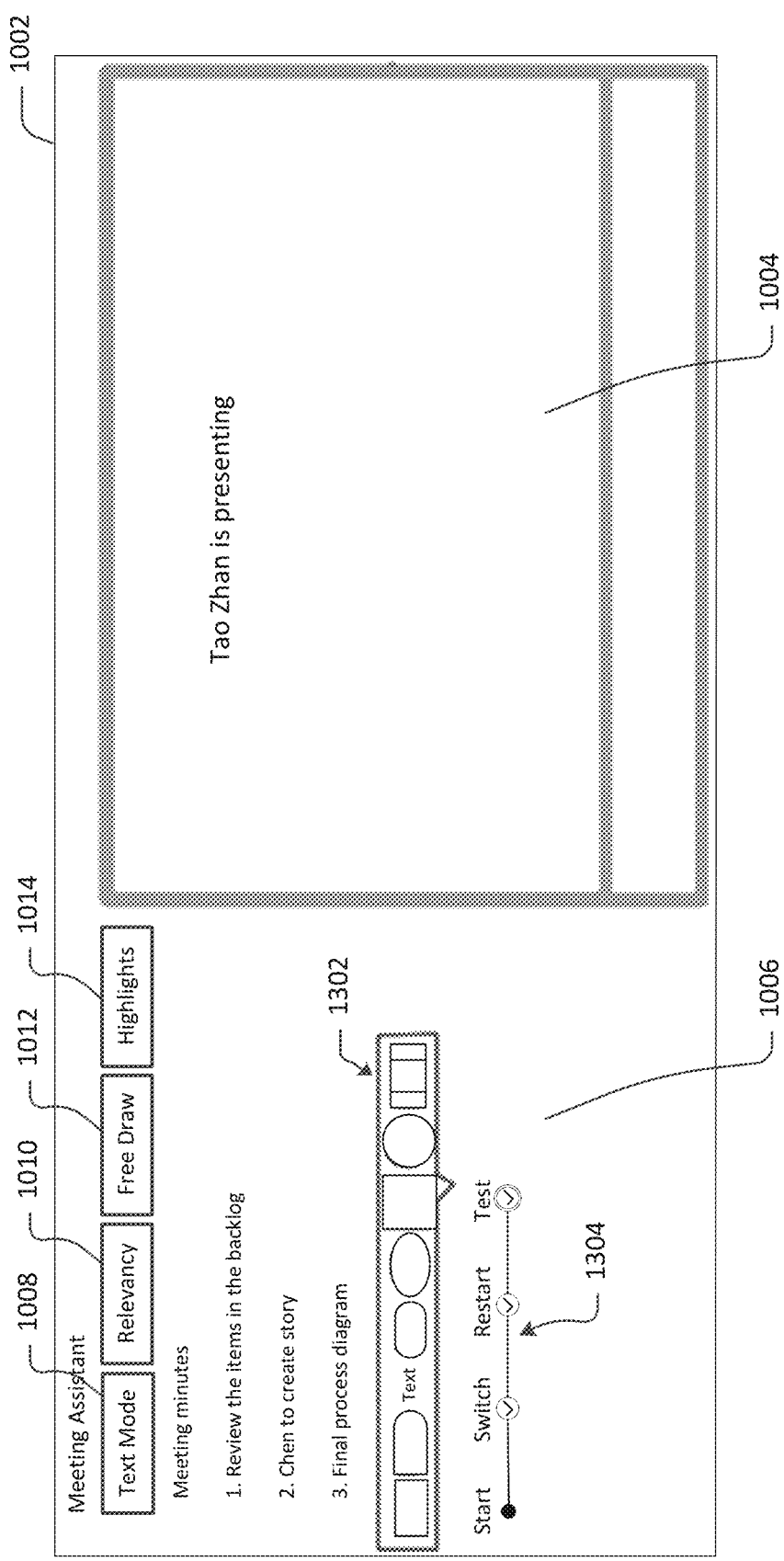
FIGS. 13A and 13B show a user interface illustrating free draw functionality, in accordance with an embodiment of the present disclosure.
Figure 13B:
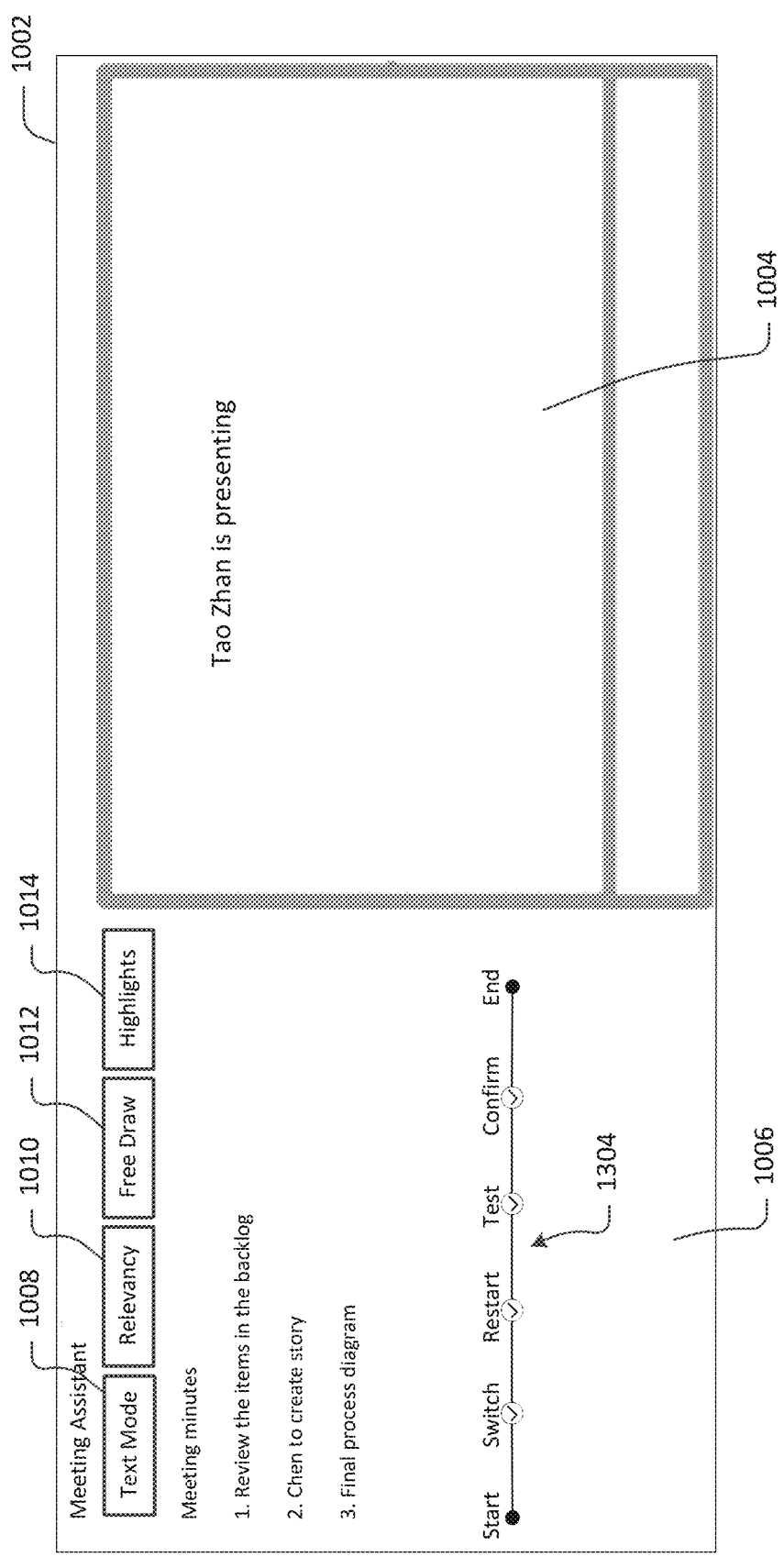

FIGS. 13A and 13B show user interface 1002 illustrating free draw functionality, in accordance with an embodiment of the present disclosure. As can be seen in FIG. 13A, control panel 1006 displays a drawing tool palette 1302 that includes several drawing shapes. For example, user 508 may have selected "Free Draw" button 1012 to input to control panel 1006 a comment in the form of a drawing. In this example, as can be seen in FIG. 13A, user 508 may have utilized one or more of the drawing shapes in drawing tool palette 1302 to draw on control panel 1006 a picture or sketch (e.g., a process diagram 1304). As shown in FIG. 13B, upon completing the drawing of process diagram 1304, user 508 may select "Free Draw" button 1012 again as an indication to media editor 516 that user 508 has completed the drawing. In response, media editor 516 may no longer display drawing tool palette 1302 in control panel 1006.

Figure 14:
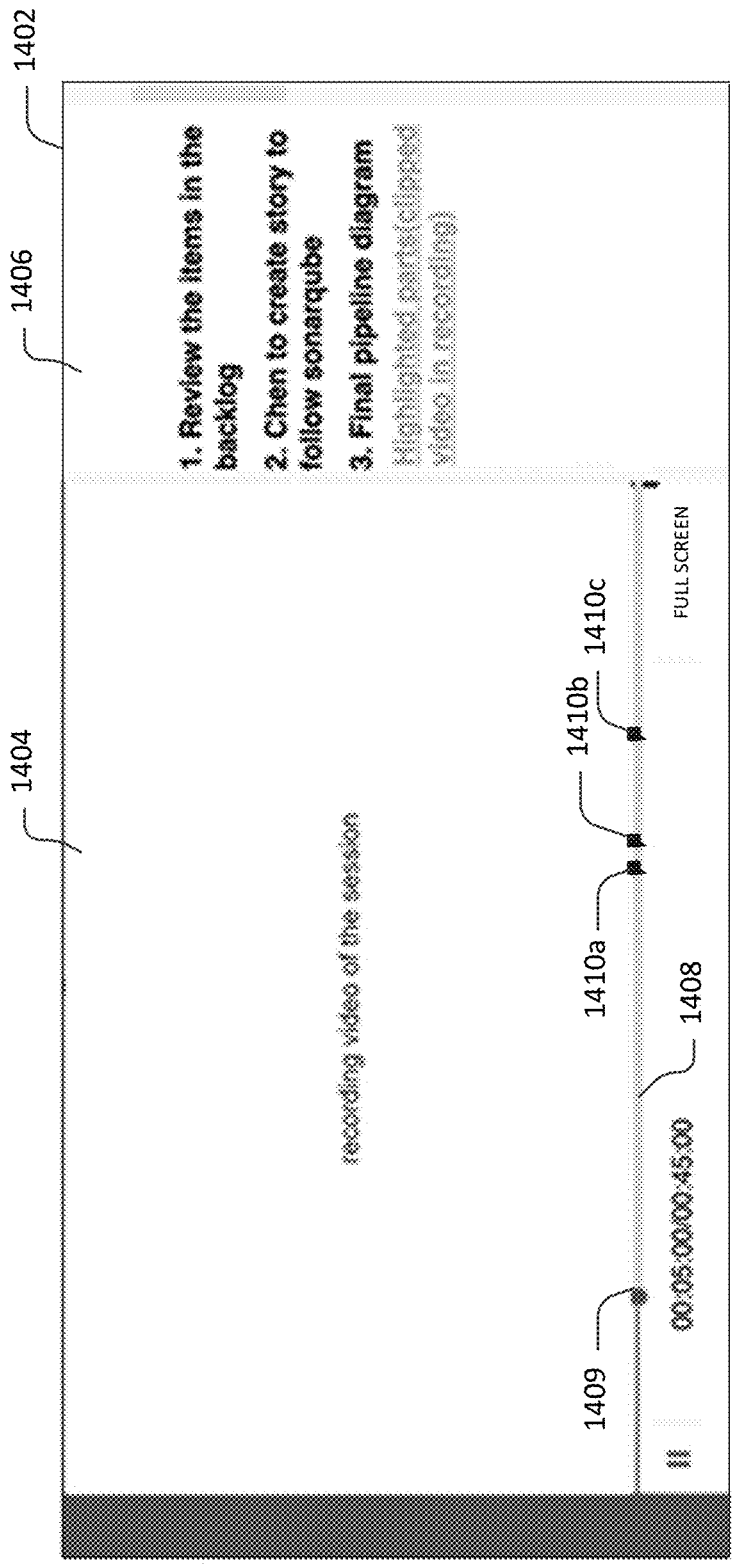
FIG. 14 shows a user interface, in accordance with an embodiment of the present disclosure.

FIG. 14 shows a user interface 1402, in accordance with an embodiment of the present disclosure. User interface 1402 may be displayed to user 508 on client device 502 upon launching of recording player 520 to view the notes generated for an online meeting. In an illustrative implementation, user interface 1402 may include a recording viewing panel 1404 and a notes panel 1406. Recording viewing panel 1404 is configured to display content (e.g., video content) of a recording of an online meeting for viewing by user 508, for example. In the case of an audio recording where a video content does not exist, recording viewing panel 1404 is configured to display a visual representation of the audio content of the recording of the online meeting. Notes panel 1406 is configured to display the notes of the online meeting whose recording is being played in recording viewing panel 1404. As shown, notes panel 1406 may display three notes indicated by the numbers 1, 2, and 3. For instance, when recording player 520 is first initiated, notes panel 1406 may initially display the notes or a portion of the notes of the online meeting whose recording is being played. User 508 may then use a vertical scroll bar or other suitable user interface control to scroll though the notes (e.g., cause the notes to be displayed within notes panel 1406.

As can be seen in FIG. 14, recording player 520 may display a timeline bar 1408 which includes a playback handle 1409. Playback handle 1409 indicates, relative to the length of timeline bar 1408, a point in the recording which is currently being played. In other words, playback handle 1409 indicates relatively what portion of the content of the recording is currently being displayed in recording viewing panel 1404. As shown, three annotation markers 1410a, 1410b, 1410c, are displayed over timeline bar 1408. The displayed annotation markers 1410a, 1410b, 1410c, may be linked to corresponding notes of the online meeting and may be displayed at relative locations over timeline bar 1408 to indicate a point in time within the online meeting at which a corresponding note is generated. For example, as indicated by the locations of annotation markers 1410a, 1410b, 1410c over timeline bar 1408, the note corresponding to annotation marker 1410b was generated after the note corresponding to annotation marker 1410a, and the note corresponding to annotation marker 1410c was generated after the note corresponding to annotation marker 1410b.

Figure 15:
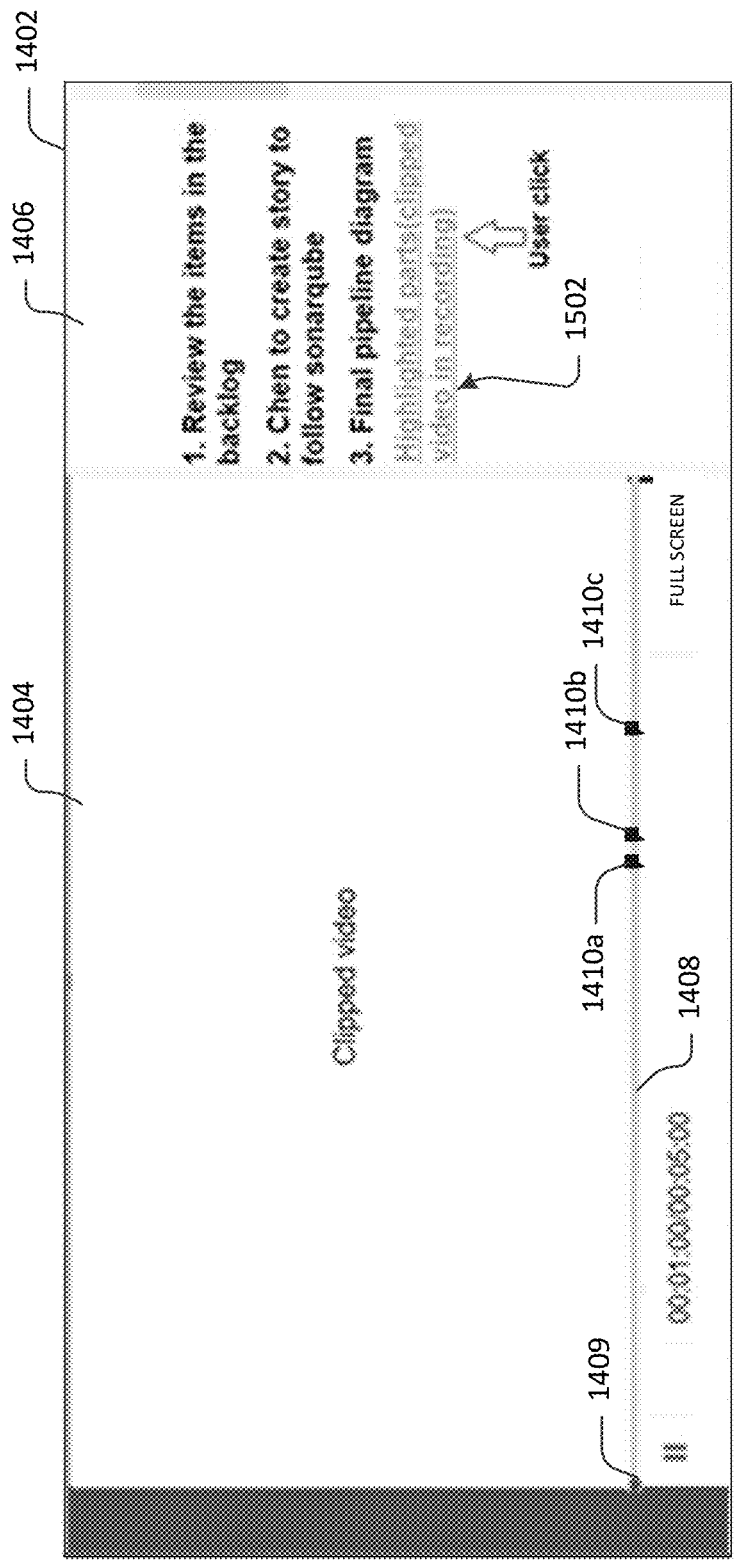
FIG. 15 shows a user interface illustrating recording playback functionality, in accordance with an embodiment of the present disclosure.

FIG. 15 shows user interface 1402 illustrating recording playback functionality, in accordance with an embodiment of the present disclosure. As can be seen, notes panel 1406 displays a note (as indicated by "3. Final pipeline diagram") that includes a link 1502 to a video clip of a highlighted (important) segment of the online meeting. The video clip may be a clip of the recording of the online meeting corresponding to the segment of the online meeting associated with the third note (as indicated by "3. Final pipeline diagram") generated for the online meeting. For example, recording player 520 may have generated the video clip based on an indication of an important segment included in the third note. When displayed in notes panel 1406, link 1502 may be selected to cause the content referenced by link 1502 to display in recording viewing panel 1404. In the illustrated example, user 508 may select link 1502 to cause the referenced video clip of the highlighted segment of the online meeting to play in recording viewing panel 1404.

Figure 16A:
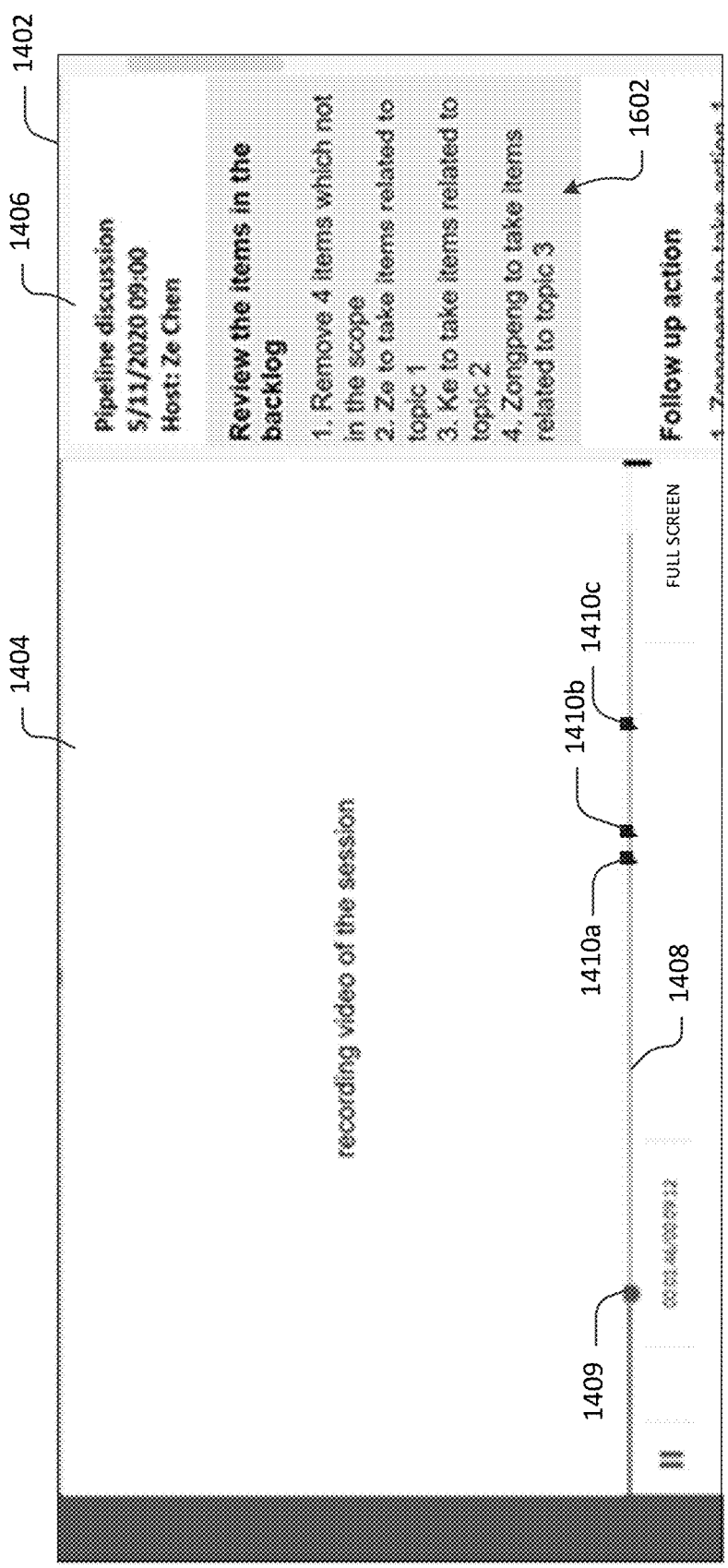
FIGS. 16A and 16B show a user interface illustrating annotation mark functionality, in accordance with an embodiment of the present disclosure.
Figure 16B:
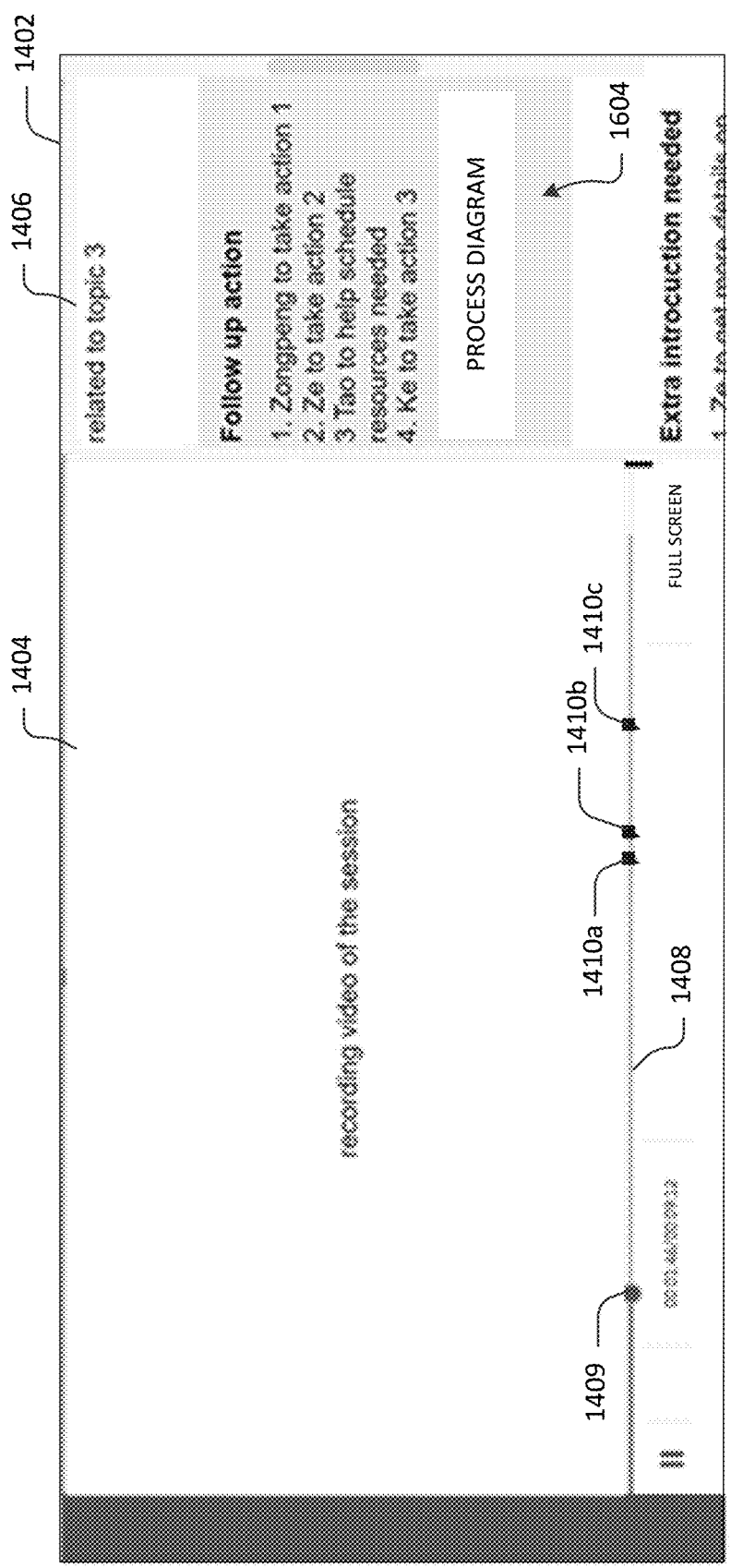

FIGS. 16A and 16B show user interface 1402 illustrating annotation mark functionality, in accordance with an embodiment of the present disclosure. As described previously, annotation markers 1410a, 1410b, 1410c, may be linked to corresponding notes of the online meeting and may be displayed at relative locations over timeline bar 1408 to indicate a point in time within the online meeting at which a corresponding note is generated. As can be seen in FIG. 16A, notes panel 1406 displays a note 1602 (as indicated by "Review the items in the backlog") including its contents. Annotation marker 1410a may be linked to note 1602. Thus, annotation marker 1410a may be selected to cause note 1602 to display in notes panel 1406 as shown in FIG. 16A. In an illustrative implementation, when displayed in notes panel 1406, note 1602 may be selected to cause the content of the recording corresponding to note 1602 to display in recording viewing panel 1404. In other words, selecting note 1602 causes the recording of the online meeting to play from the point in time indicated by annotation marker 1410a.

As can be seen in FIG. 16B, notes panel 1406 displays a note 1604 (as indicated by "Follow up action") including its contents. Annotation marker 1410b may be linked to note 1604. Thus, annotation marker 1410b may be selected to cause note 1604 to display in notes panel 1406 as shown in FIG. 16B. Also, when displayed in notes panel 1406, note 1604 may be selected to cause the content of the recording corresponding to note 1604 to display in recording viewing panel 1404. In other words, selecting note 1604 causes the recording of the online meeting to play from the point in time indicated by annotation marker 1410b.

In some embodiments, recording player 502 may display a note in notes panel 1406 relative to the content of the recording that is being played. For instance, when the playing of a recording reaches a point associated with a note (e.g., as handle 1409 reaches a point in timeline bar 1408 associated with a note) during the playing of the recording, recording player 502 may display the note within notes panel 1406. For example, when handle 1409 reaches a point in timeline bar 1408 associated with annotation marker 1410a, recording player 502 may display note 1602 in notes panel 1406. Then, when handle 1409 reaches a point in timeline bar 1408 associated with annotation marker 1410b, recording player 502 may display note 1604 in notes panel 1406.

In some embodiments, when an annotation marker is selected, the corresponding note may be displayed in notes panel 1406 in a prominent manner (for example, highlighted or shaded to display prominently in notes panel 1406). In some embodiments, recording player 502 may allow content (e.g., notes) displayed within notes panel 1406 to edited, moved, and/or deleted. In some embodiments, recording player 502 may allow a user to add a new note. In the case where a note is moved to another location within notes panel 1406, recording player 502 may interpolate a point in time for the moved note based on the points in time of the immediately preceding note and the immediately following note.

FURTHER ILLUSTRATIVE EMBODIMENTS

The following examples pertain to further embodiments, from which numerous permutations and configurations will be apparent.

Example 1 includes a method including: receiving, by a computing device, an input from a user during an online meeting; generating, by the computing device, a note comprising the input and a timestamp recording a point in time within the online meeting at which the note is generated; providing, by the computing device, a user interface in which to display content of the online meeting and the note, the user interface including an annotation marker indicative of an availability of the note; and, in response to a selection of the note in the user interface, adjusting a display of the content to a point in the content corresponding to the timestamp.

Example 2 includes the subject matter of Example 1, wherein generating the note is in response to passage of a predetermined period of idle input time during which no input is received between successive inputs.

Example 3 includes the subject matter of any of Examples 1 and 2, wherein the input comprises text.

Example 4 includes the subject matter of any of Examples 1 through 3, wherein the input comprises an image.

Example 5 includes the subject matter of any of Examples 1 through 4, wherein the input comprises a drawing.

Example 6 includes the subject matter of any of Examples 1 through 5, wherein the input comprises a screenshot of a user interface of an application used to host the online meeting.

Example 7 includes the subject matter of any of Examples 1 through 6, wherein the input comprises an indication of a highlight segment start time and an indication of a corresponding highlight segment end time, the highlight segment start time and the corresponding highlight segment end time indicating an important segment within the online meeting.

Example 8 includes the subject matter of any of Examples 1 through 7, wherein the input comprises an indication of an unimportant segment start time and an indication of a corresponding unimportant segment end time, the unimportant segment start time and the corresponding unimportant segment end time indicating an unimportant segment within the online meeting.

Example 9 includes the subject matter of any of Examples 1 through 8, further comprising, in response to selection of the annotation marker, displaying the note in the user interface.

Example 10 includes a system including a memory and one or more processors in communication with the memory and configured to: receive an input from a user during an online meeting; generate a note comprising the input and a timestamp recording a point in time within the online meeting at which the note is generated; provide a user interface in which to display content of the online meeting and the note, the user interface including an annotation marker indicative of an availability of the note; and in response to a selection of the note in the user interface, adjust a display of the content to a point in the content corresponding to the timestamp.

Example 11 includes the subject matter of Example 10, wherein to generate the note is in response to passage of a predetermined period of idle input time during which no input is received between successive inputs.

Example 12 includes the subject matter of any of Examples 10 and 11, wherein the input comprises text.

Example 13 includes the subject matter of any of Examples 10 through 12, wherein the input comprises an image.

Example 14 includes the subject matter of any of Examples 10 through 13, wherein the input comprises a drawing.

Example 15 includes the subject matter of any of Examples 10 through 14, wherein the input comprises an image of a user interface of an application.

Example 16 includes the subject matter of any of Examples 10 through 15, wherein the input comprises an indication of a highlight segment start time and an indication of a corresponding highlight segment end time, the highlight segment start time and the corresponding highlight segment end time indicating an important segment within the online meeting.

Example 17 includes the subject matter of any of Examples 10 through 16, wherein the input comprises an indication of an unimportant segment start time and an indication of a corresponding unimportant segment end time, the unimportant segment start time and the corresponding unimportant segment end time indicating an unimportant segment within the online meeting.

Example 18 includes the subject matter of any of Examples 10 through 17, wherein the one or more processors are further configured to, in response to selection of the annotation marker, display the note in the user interface.

Example 19 includes a method including: receiving, by a computing device, content of an online meeting; receiving, by the computing device, an input from a user, the input including an indication of time in which the input was received by the computing device; and providing, by the computing device, a user interface in which to display the content of the online meeting and the received input, the user interface including an annotation and being configured to adjust a display of the content to a point in the content the same as that of the indication of time included with the received input in response to a selection of the received input or the annotation, the annotation included with the display of the content being indicative of an availability of the received input.

Example 20 includes the subject matter of Example 19, wherein the input comprises one of text, and image, a drawing, or a screenshot of a user interface of an application used to host the online meeting.

Example 21 includes the subject matter of any of Examples 19 and 20, wherein the input comprises an indication of a highlight segment start time and an indication of a corresponding highlight segment end time, the highlight segment start time and the corresponding highlight segment end time indicating an important segment within the online meeting.

Example 22 includes the subject matter of any of Examples 19 through 21, wherein the input comprises an indication of an unimportant segment start time and an indication of a corresponding unimportant segment end time, the unimportant segment start time and the corresponding unimportant segment end time indicating an unimportant segment within the online meeting.

Example 23 includes a system including a memory and one or more processors in communication with the memory and configured to: receive content of an online meeting; receive an input from a user, the input including an indication of time in which the input was received by the computing device; and provide a user interface in which to display the content of the online meeting and the received input, the user interface including an annotation and being configured to adjust a display of the content to a point in the content the same as that of the indication of time included with the received input in response to a selection of the received input or the annotation, the annotation included with the display of the content being indicative of an availability of the received input.

Example 24 includes the subject matter of Example 23, wherein the input comprises one of text, and image, a drawing, or a screenshot of a user interface of an application used to host the online meeting.

Example 25 includes the subject matter of any of Examples 23 and 24, wherein the input comprises an indication of a highlight segment start time and an indication of a corresponding highlight segment end time, the highlight segment start time and the corresponding highlight segment end time indicating an important segment within the online meeting.

Example 26 includes the subject matter of any of Examples 23 through 25, wherein the input comprises an indication of an unimportant segment start time and an indication of a corresponding unimportant segment end time, the unimportant segment start time and the corresponding unimportant segment end time indicating an unimportant segment within the online meeting.

Example 27 includes a method including: displaying, by a computing device, a user interface comprising a content panel and a control panel, the content panel configured to display content associated with an online meeting being hosted using an application for hosting online meetings, the control panel configured to receive media content; receiving, during the online meeting, one or more items of content input to the control panel; in response to passage of a predetermined period of idle input time during which no input is received via the control panel, generating a note comprising the input one or more items of content and a timestamp recording a point in time within the online meeting at which the note is generated; and storing the generated note in a memory device accessible during playback of a recording of the online meeting.

Example 28 includes a system including a memory and one or more processors in communication with the memory and configured to: display a user interface comprising a content panel and a control panel, the content panel configured to display content associated with an online meeting being hosted using an application for hosting online meetings, the control panel configured to receive media content; receive, during the online meeting, one or more items of content input to the control panel; in response to passage of a predetermined period of idle input time during which no input is received via the control panel, generate a note comprising the input one or more items of content and a timestamp recording a point in time within the online meeting at which the note is generated; and store the generated note in a memory device accessible during playback of a recording of the online meeting.

Example 29 includes a method including: displaying, by a computing device, a playback interface comprising a recording viewing panel and a notes panel, the recording viewing panel configured to display content associated with a recording of an online meeting, the notes panel configured to display notes associated with the online meeting; displaying a timeline bar comprising a playback handle indicating a point in the recording which is currently being played, the timeline bar further comprising an annotation marker at a relative location to indicate a point in time within the online meeting at which a note was generated; and, in response to an input selecting the annotation marker, displaying in the notes panel one or more items of content included in the note, at least one of the one or more items of content being a link to the annotation marker such that selecting the at least one of the one or more items of content causes the recording to play from the point in time indicated by the annotation marker.

Example 30 includes the subject matter of Example 29, wherein the one or more items of content comprises a link to a clip of the recording.

Example 31 includes a system including a memory and one or more processors in communication with the memory and configured to: display a playback interface comprising a recording viewing panel and a notes panel, the recording viewing panel configured to display content associated with a recording of an online meeting, the notes panel configured to display notes associated with the online meeting; display a timeline bar comprising a playback handle indicating a point in the recording which is currently being played, the timeline bar further comprising an annotation marker at a relative location to indicate a point in time within the online meeting at which a note was generated; and, in response to an input selecting the annotation marker, display in the notes panel one or more items of content included in the note, at least one of the one or more items of content being a link to the annotation marker such that selecting the at least one of the one or more items of content causes the recording to play from the point in time indicated by the annotation marker.

Example 32 includes the subject matter of Example 31, wherein the one or more items of content comprises a link to a clip of the recording.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modules executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
    receiving, by a computing device, a recording of an online meeting;
    identifying, by the computing device, a segment of the recording of the online meeting, the segment of the recording of the online meeting indicated as being unimportant during the online meeting;
    removing, by the computing device, the segment of the recording of the online meeting from the recording of the online meeting; and
    adjusting, by the computing device, one or more timestamps of the recording to account for a reduction in a length of the recording caused by the removal of the segment of the recording of the online meeting, wherein a timestamp of the one or more timestamps records a point in time within the online meeting at which a note is generated, and wherein the note comprises a screenshot of contents of a user interface of an application used to host the online meeting.

2. The method of claim 1, wherein the note comprises text.

3. The method of claim 1, wherein the note comprises a drawing.

4. The method of claim 1, wherein a timestamp of the one or more timestamps records a highlight segment start time within the online meeting.

5. The method of claim 1, wherein a timestamp of the one or more timestamps records a highlight segment end time within the online meeting.

6. A system comprising:
    a memory; and
    one or more processors in communication with the memory and configured to,
        receive a recording of an online meeting;
        identify a segment of the recording of the online meeting, the segment of the recording of the online meeting indicated as being unimportant during the online meeting;
        remove the segment of the recording of the online meeting from the recording of the online meeting; and
        adjust one or more timestamps of the recording to account for a reduction in a length of the recording caused by the removal of the segment of the recording of the online meeting, wherein a timestamp of the one or more timestamps records a point in time within the online meeting at which a note is generated, and wherein the note comprises a screenshot of contents of a user interface of an application used to host the online meeting.

7. The system of claim 6, wherein the note comprises text.

8. The system of claim 6, wherein the note comprises a drawing.

9. The system of claim 6, wherein a timestamp of the one or more timestamps records a highlight segment start time within the online meeting.

10. The system of claim 6, wherein a timestamp of the one or more timestamps records a highlight segment end time within the online meeting.

* * * * *